(12) United States Patent
Wang et al.

(10) Patent No.: US 11,232,571 B2
(45) Date of Patent: Jan. 25, 2022

(54) METHOD AND DEVICE FOR QUICK SEGMENTATION OF OPTICAL COHERENCE TOMOGRAPHY IMAGE

(71) Applicant: SOOCHOW UNIVERSITY, Suzhou (CN)

(72) Inventors: Lirong Wang, Suzhou (CN); Meng Gan, Suzhou (CN); Cong Wang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 67 days.

(21) Appl. No.: 16/757,385

(22) PCT Filed: May 31, 2019

(86) PCT No.: PCT/CN2019/089407
§ 371 (c)(1),
(2) Date: Apr. 18, 2020

(87) PCT Pub. No.: WO2020/140380
PCT Pub. Date: Jul. 9, 2020

(65) Prior Publication Data
US 2021/0209763 A1 Jul. 8, 2021

(30) Foreign Application Priority Data
Dec. 30, 2018 (CN) .......................... 201811648993.8

(51) Int. Cl.
*G06T 7/11* (2017.01)
*G06T 7/00* (2017.01)
(52) U.S. Cl.
CPC .............. *G06T 7/11* (2017.01); *G06T 7/0012* (2013.01); *G06T 2207/10101* (2013.01)
(58) Field of Classification Search
None
See application file for complete search history.

(56) References Cited

U.S. PATENT DOCUMENTS

| 8,750,615 | B2 * | 6/2014 | Rollins | ...................... | G06T 7/12 |
| | | | | | 382/173 |
| 2004/0220892 | A1 * | 11/2004 | Cohen | ................... | G06N 7/005 |
| | | | | | 706/20 |

FOREIGN PATENT DOCUMENTS

| CN | 105551038 | A | * | 5/2016 |
| CN | 105551038 | A | | 5/2016 |

(Continued)

OTHER PUBLICATIONS

Machine translation of CN-105551038-A (Year: 2016).*
Guo, Jingyun, Master Thesis, Soochow University, May 14, 2018.

*Primary Examiner* — Vu Le
*Assistant Examiner* — Courtney Joan Nelson
(74) *Attorney, Agent, or Firm* — Szdc Law P.C.

(57) ABSTRACT

The present invention discloses a method and device for quick segmentation of an optical coherence tomography image, a computing device, and a computer readable storage medium. The method includes: extracting a feature value related to a pixel in the optical coherence tomography image from the pixel to obtain a feature value representative of the pixel feature, the feature value including at least one of an intensity gradient value of the pixel, an intensity multi-scale mean value of the pixel, and an angular feature value extracted from the pixel; inputting the feature value into a Sparse Bayesian Classification model containing values related to image features corresponding to a border, to obtain a probability that the image feature belongs to features of various image region borders; and obtaining borders of various image regions contained in a predefined image region based on the probabilities obtained for various pixels in the predefined image region.

8 Claims, 9 Drawing Sheets

(56) References Cited

FOREIGN PATENT DOCUMENTS

| | | | |
|---|---|---|---|
| CN | 106611422 | A | 5/2017 |
| CN | 106934761 | A | 7/2017 |
| CN | 109816665 | A | 5/2019 |

* cited by examiner configuring a Sparse Bayesian model on the basis that the probability of the feature value vector relative to a related vector representative of features of border pixels of various image regions satisfies the Bernoull distribution, and obtaining the Sparse Bayesian Classification model containing related vectors of image features corresponding to the border by inputting a feature value vector related to features of each of the pixels in the image region containing the border extracted from the pixel into a Sparse Bayesian Classification model and performing calculation thereon ⟵ 302 extracting a plurality of feature values related to a pixel in the optical coherence tomography image from the pixel to obtain a feature value vector representative of the pixel feature ⟵ 304 inputting the extracted feature value vector into the Sparse Bayesian Classification model containing the related vectors of the image features corresponding to the border, to obtain the probability that the image feature belongs to border features of various image regions ⟵ 306 obtaining the border of various image regions contained in the predefined image region based on the probability obtained for various pixels in the predefined image region ⟵ 308

FIG. 3

METHOD AND DEVICE FOR QUICK SEGMENTATION OF OPTICAL COHERENCE TOMOGRAPHY IMAGE

This application is the National Stage Application of PCT/CN2019/089407, filed on May 31, 2019, which claims priority to Chinese Patent Application No.: 201811648993.8, filed on Dec. 30, 2018, which is incorporated by reference for all purposes as if fully set forth herein.

FIELD OF THE INVENTION

The present invention relates to the field of image processing, and more particularly, to a method and device for quick segmentation of an optical coherence tomography image, a computing device, and a computer readable storage medium.

DESCRIPTION OF THE RELATED ART

Optical coherence tomography images, also referred to as OCT images, are images obtained through OCT and are applied mainly in medical diagnosis. Endoscopic OCT, as one of the important OCT techniques, is utilized in combination with an endoscope to enter a body lumen in a minimally invasive manner and image living biological tissues in real time, representing a novel prospect for clinical diagnosis. Doctors can observe the OCT image to determine whether there is any abnormal characteristic in lumen histology and consequently determine whether the subject has a disease and the stage of the disease. However, manual observation and diagnosis are difficult and time-consuming and may neglect some diseases due to subjective factors, thereby missing the best treating time. Therefore, a reliable method and device for quick automated segmentation of an OCT image are needed in clinical practices to enable precise location of various regions of the lumen tissue in the OCT image and accurate computer-aided quantification of lumen conditions, thereby improving working efficiency for doctors and allowing early diagnosis of diseases.

Existing research on active segmentation of OCT images is essentially focused on two methods, one based on mathematical models, the other based on machine learning. The method based on mathematical models is implemented by constructing a mathematical model according to structural forms of the image to be segmented, including, for example, A-scan-based method, Active Contour, and Graph Cut, etc. These methods are implemented with a quality that depends significantly on the difference between the border of the tissue to be segmented and other regions and have a low segmentation efficiency and poor segmentation precision. The method based on machine learning, which translates segmentation into classification, is under prevalent research and provides effective segmentation. However, current research on segmentation based on machine learning is still in its beginning stage and mainly focused on retina techniques, resulting in limited achievements.

Therefore, current methods and devices for segmentation of an endoscopic OCT image of a body lumen have disadvantages of low segmentation accuracy and poor segmentation efficiency.

The information disclosed in this Background section is intended merely to aid in understanding of the general background of the invention and should not be taken as acknowledgement or any implication that the information constitutes prior art that is already known to those of ordinary skill in the art.

SUMMARY OF THE INVENTION

It is an object of the present invention to provide a method and device for quick segmentation of an optical coherence tomography image, a computing device, and a computer readable storage medium that can overcome the disadvantages of prior art.

In a first aspect, an embodiment of this disclosure discloses a method for quick segmentation of an optical coherence tomography image, including the steps of:

extracting a feature value related to a pixel in the optical coherence tomography image from the pixel to obtain a feature value representative of the pixel feature, the extracted feature value including at least one of an intensity gradient value of the pixel, an intensity multi-scale mean value of the pixel, or an angular feature value extracted from the pixel;

inputting the extracted feature value into a Sparse Bayesian Classification model containing values related to image features corresponding to a border to obtain a probability that the image feature belongs to border features of various image regions; and obtaining borders of various image regions contained in a predefined image region based on the probabilities obtained for various pixels in the predefined image region.

In a second aspect, an embodiment of this disclosure discloses a device for quick segmentation of an optical coherence tomography image, including:

an extraction module configured to extract a feature value related to a pixel in the optical coherence tomography image from the pixel to obtain a feature value representative of the pixel feature, the extracted feature value including, but not limited to, at least one of an intensity gradient value of the pixel, an intensity multi-scale mean value of the pixel, or an angular feature value extracted from the pixel;

a calculation module configured to input the extracted feature value into a Sparse Bayesian Classification model containing related vectors of image features corresponding to the border to obtain a probability that the image feature belongs to border features of various image regions; and a border determination module configured to obtain borders of various image regions contained in a predefined image region based on the probabilities obtained for various pixels in the predefined image region.

In a third aspect, an embodiment of this disclosure discloses a computing device including a memory, a processor, and computer instructions stored in the memory and executable on the processor that, when executed by the processor, implement steps of the method for quick segmentation of an optical coherence tomography image as described above.

In a fourth aspect, an embodiment of this disclosure discloses a computer readable storage medium having computer instructions stored thereon that, when executed by a processor, implement steps of the method for quick segmentation of an optical coherence tomography image as described above.

Compared with prior art, the method and device for quick segmentation of an optical coherence tomography image, the computing device, and the computer readable storage medium provided by this disclosure have the following beneficial effects. By extracting a feature value related to a pixel in the optical coherence tomography image from the pixel to obtain a feature value representative of the pixel feature, feature values representative of the image pixel can be extracted based on features of the pixels, thereby ensuring accuracy of segmentation. By inputting the extracted feature values into a Sparse Bayesian Classification model to obtain probabilities that the image feature belongs to border features of various image regions, the pixel features can be compared with border features of various image regions, thereby ensuring accuracy of segmentation. By obtaining borders of various image regions based on the probabilities obtained for various pixels in the image region, well-defined and sharp borders of various regions can be obtained based on the probabilities that the pixels belong to borders of various image region, thereby fulfilling the aim of good distinction between various regions in a body tissue.

BRIEF DESCRIPTION OF THE DRAWINGS

FIG. 3 is a flowchart of a method for quick segmentation of an optical coherence tomography image according to an embodiment of this disclosure;

DETAILED DESCRIPTION OF THE PREFERRED EMBODIMENTS

Figure 1:
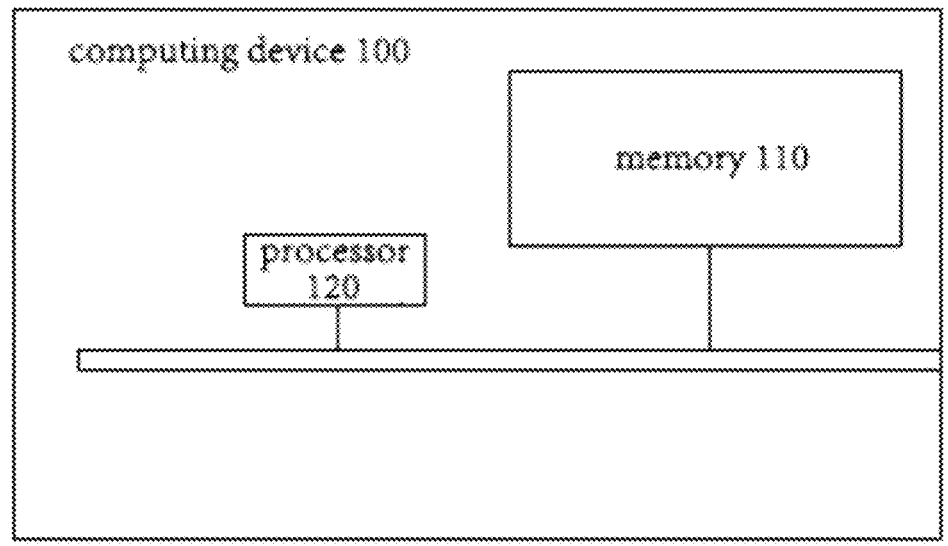
FIG. 1 is a schematic drawing of a framework of a computing device according to this disclosure.

Exemplary embodiments of this disclosure will be described in more detail below with reference to the accompanying drawings. Although exemplary embodiments of this disclosure are shown in the drawings, it is understood that this disclosure may be implemented in various forms and should not be limited by the embodiments set forth herein. On the contrary, these embodiments are provided to enable a more thorough understanding of this disclosure and to fully convey the scope of this disclosure to those skilled in the art.

This disclosure provides a method and device for quick segmentation of an optical coherence tomography image, a computing device, and a computer readable storage medium, which shall be described individually in detail in the embodiments hereinafter.

FIG. 1 is a schematic drawing of a framework of a computing device 100 for quick segmentation of an optical coherence tomography image according to an embodiment of this disclosure. The computing device 100 have components including, but not limited to, a memory 110, a processor 120, and computer instructions stored in the memory 110 and executable on the processor 120. The processor 110 is configured to perform data processing analysis based on a person associated with a subject in analysis of the influence of the subject according to user instructions received by the computing device 110 and computer instructions stored in the memory 110. The memory 110 and the processor 120 are interconnected via a bus.

The computing device 100 may further include a network interface through which the computing device 100 communicates with one or more networks. The network interface may include one or more of any type of network interfaces, whether wired or wireless.

Figure 2:
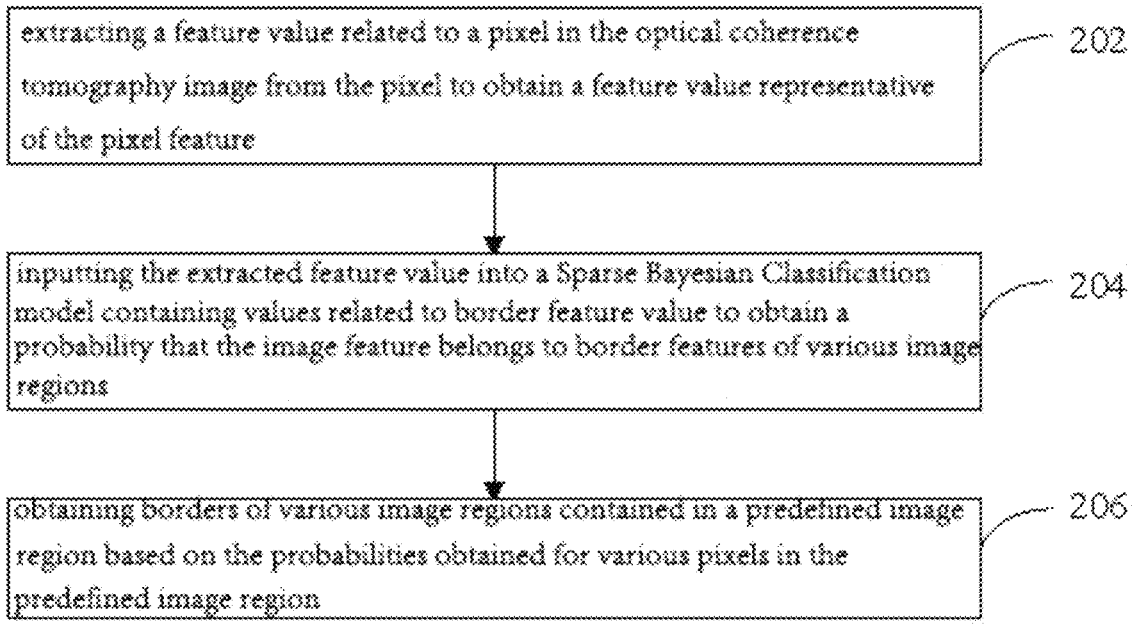
FIG. 2 is a flowchart of a method for quick segmentation of an optical coherence tomography image according to an embodiment of this disclosure.
Figure 4:
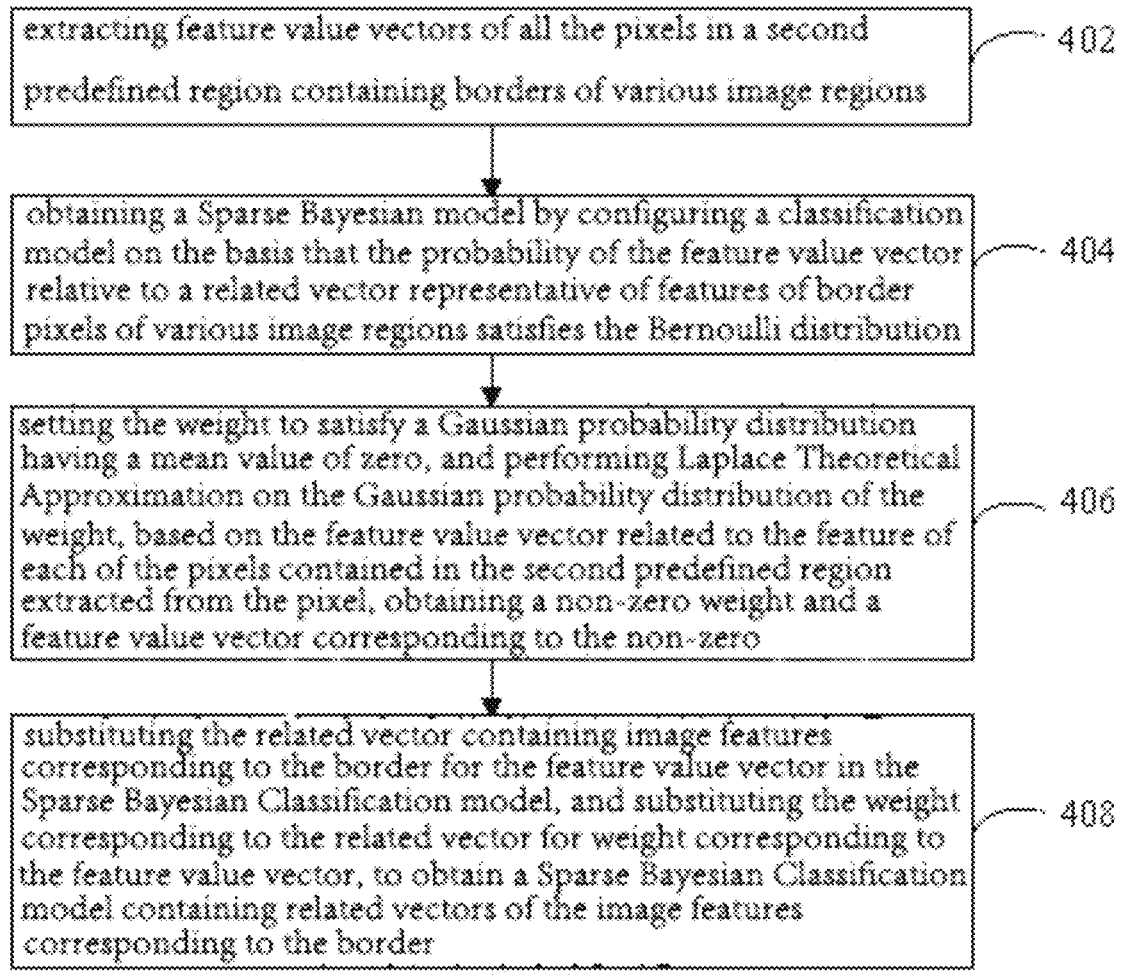
FIG. 4 is a flowchart of the step 302 from FIG. 3 according to this disclosure.

The processor 120 can perform the steps in the method shown in FIG. 2. FIG. 2 is a flowchart of a method for quick segmentation of an optical coherence tomography image according to an embodiment of this disclosure, including Steps 202 to 206.

Step 202: extracting a feature value related to a pixel in the optical coherence tomography image from the pixel to obtain a feature value representative of the pixel feature.

In one or more embodiments of this disclosure, a feature value related to a pixel in the optical coherence tomography image is extracted from the pixel to obtain a feature value representative of the pixel feature, the extracted feature value includes, but not limited to, at least one of an intensity gradient value of the pixel, an intensity multi-scale mean value of the pixel, or an angular feature value extracted from the pixel. The intensity multi-scale mean value of a pixel is the mean value of $2^d$ pixels surrounding said pixel as the center along a particular direction, such as a vertical or horizontal direction, and is expressed by the equation of $$h^d = \frac{1}{2^d} \sum_{\Delta y=1-2^{d-1}}^{1+2^{d-1}} I(y+\Delta y)$$

where d is a natural number greater than or equal to zero. The intensity gradient value of said pixel in a corresponding scale can be calculated by the equation of $$g^d(y) = h^d(y+2^{d-1}) - h^d(y-2^{d-1})$$

and specifically, $h^0(y)=I(y)$, $g^0(y)=I(y+1)-I(y)$.

The intensity gradient value of the pixel or the intensity multi-scale mean value of the pixel can be obtained by assuming d as a particular natural number.

The above intensity gradient value of the pixel describes the variation in intensity of the pixel along a particular direction, such as a vertical or horizontal direction. However, various regions in the image have a border that is generally curved and deviated from the particular direction by a small angle. Therefore, the intensity gradient value of the pixel and the intensity multi-scale mean value of the pixel along the particular direction are not sufficient for characterizing the features of the pixel, and an angular feature value related to the angle of the pixel also needs to be extracted. The angular feature value extracted from the pixel includes a feature value extracted along a direction that is deviated from the particular direction, such as the vertical or horizontal direction, of the pixels by a predefined angle.

The angular features extracted from the pixel includes angular features related to the angle of the pixel that are extracted through Gabor wavelet transform, Haar wavelet transform, or Daubechies wavelet transform. In an example of Gabor wavelet transform,
a two-dimensional Gabor function is defined as $$G(x, y) = \frac{f^2}{\pi\gamma\eta}\exp\left(-\frac{x_v^2 + y^2 y_v^2}{2\sigma^2}\right)\exp(j2\pi f x^r + \phi)$$
$$x_r = x\cos\theta + y\sin\theta$$
$$y_r = -x\sin\theta + y\cos\theta$$

where f is the frequency of a sine function; θ is the orientation of parallel stripes of a Gabor function; Φ is the phase compensation; σ is the standard deviation of a Gaussian function; and r is the scale factor. Discretization of the Gabor function can produce a set of discrete Gabor wavelets of, specifically, $$\{G_{f_u,\theta_v}\}$$
$$f_n = \frac{f_{max}}{\sqrt{2}^u}, u = 0, 1, \ldots U - 1$$
$$\theta_v = \frac{v}{V}\pi, v = 0, \ldots, V - 1$$

where u and v are respectively a scale parameter for a distance from the central point of the pixel and an angular parameter with respect to the central line of the pixel of a Gabor wavelet, $f_{max}$ is the maximum center frequency, and is a preset value. The feature of the Gabor wavelet depends on both the angular parameter and the scale parameter. Adjustments to the angular parameter allows matching of various angular features related to the angle of the pixel, and adjustments to the scale parameter allows multi-resolution analysis of the pixel.

By assuming v as a particular natural number, an angular feature value can be obtained for the pixel at a particular angle.

Step 204: inputting the extracted feature value into a Sparse Bayesian Classification model containing values related to image features corresponding to the border to obtain a probability that the image feature belongs to border features of various image regions.

In one or more embodiments of this disclosure, the extracted feature value is input into a Sparse Bayesian Classification model containing related vectors of image features corresponding to the border to obtain a probability that the image feature belongs to border features of various image regions. The Sparse Bayesian Classification model is a mathematical calculation model that performs calculation on a feature value extracted from a pixel and a value related to the border feature value to obtain the probability that the image feature belongs to border features of various image regions. The feature value input into the Sparse Bayesian Classification model corresponds to the value related to the border feature value contained in the Sparse Bayesian Classification model. The Sparse Bayesian Classification model containing values related to image features corresponding to the border includes one that is obtained by inputting a feature value related to each of the pixels in the image region containing the border extracted from the pixel into a Sparse Bayesian Classification model and performing calculation thereon.

The intensity gradient value of the pixel can be input into the Sparse Bayesian Classification model containing values related to the intensity gradient of the border to obtain a probability that the intensity gradient of the pixel belongs to the intensity gradient of the border. Alternatively, the intensity multi-scale mean value of the pixel can be input into the Sparse Bayesian Classification model containing values related to the intensity of a border pixel, to obtain a probability that the pixel intensity of the pixel belongs to the intensity of a border pixel. Alternatively, the angular feature value extracted from the pixel can be input into the Sparse Bayesian Classification model containing values related to the angular feature of a border pixel extracted from the border pixel of the border, to obtain a probability that the angular feature of the pixel extracted from the pixel belongs to the angular features related to the angle corresponding to the border pixel extracted from the border pixel of the border.

Step 206: obtaining borders of various image regions contained in the predefined image region based on the probabilities obtained for various pixels in the predefined image region.

In one or more embodiments of this disclosure, borders of various image regions contained in the predefined image region are obtained based on the probabilities obtained for various pixels in the predefined image region. The feature value of each of the pixels in the predefined image region is input into the Sparse Bayesian Classification model containing values related to the border features, to obtain a probability for each of the pixels in the predefined image region. Borders of various image regions contained in the predefined image region are obtained based on the probability for each of the pixels in said image region. Given that the probabilities for various pixels in the predefined image region are within a particular data range, the pixels are set as pixels in borders of various image regions, and borders of various images are obtained based on the pixels in the obtained borders of various image regions. The data range here is greater than 0.95 or less than 0.1.

The operation of obtaining borders of various image regions contained in a predefined image region based on the probabilities obtained for various pixels in the predefined image region can alternatively be performed by using the method to be described below.

A multi-dimensional probability vector for the location of each of the pixels in the predefined image region is obtained based on the probability for the pixel in the image region and the location of the pixel.

The probability representative of a border location is extracted from the multi-dimensional probability vector depending on the shapes of borders of various image regions to be extracted. If the borders of various image regions to be extracted are perpendicular to a column of the multi-dimensional probabilities, then the pixel location corresponding to the maximum probability is obtained based on the probabilities extracted from each column in the probability vector. If the borders of various image regions to be extracted are parallel to a column of the multi-dimensional probabilities, then the pixel location corresponding to the maximum probability is obtained based on the probability extracted from each row in the probability vector. The probability representative of the border location extracted from the multi-dimensional probability includes the maximum or minimum probability in each column or row in the multi-dimensional probability vector.

The pixel location corresponding to the probability representative of the border location is obtained based on said probability. The pixel location corresponding to the maximum or minimum probability is obtained based on the maximum or minimum probability in each column or row in the probability vector obtained.

Borders of various image regions are obtained based on the obtained pixel location. The pixel is marked in the predefined image region based on the obtained pixel location to obtain the borders of various image regions.

By extracting a feature value related to a pixel in the optical coherence tomography image from the pixel to obtain a feature value representative of the pixel feature, feature values representative of the image pixel can be extracted based on features of the image pixels to obtain a border, thereby ensuring accuracy of segmentation. Borders of various image regions obtained based on the probability that the pixel belongs to borders of various image regions using the Sparse Bayesian Classification model are well-defined and sharp, thereby fulfilling the aim of good distinction between various regions in the optical coherence tomography image of a body tissue.

In this disclosure, a processor is provided for performing steps in the method shown in FIG. 3. FIG. 3 is a schematic flowchart of a method for quick segmentation of an optical coherence tomography image according to an embodiment of this disclosure, including Steps 302 to 313.

Step 302: configuring a Sparse Bayesian model on the basis that the probability of the feature value vector relative to a related vector representative of features of border pixels of various image regions satisfies the Bernoulli distribution, and obtaining the Sparse Bayesian Classification model containing related vectors of image features corresponding to the border by inputting a feature value vector related to features of each of the pixels in the image region containing the border extracted from the pixel into a Sparse Bayesian Classification model and performing calculation thereon.

A plurality of feature values related to a pixel in the optical coherence tomography image are extracted from the pixel to obtain a feature value vector representative of the pixel feature. The plurality of feature values related to a pixel in the optical coherence tomography image extracted from the pixel include at least one of an intensity gradient value of the pixel, an intensity multi-scale mean value of the pixel, or an angular feature value extracted from the pixel. The feature value vector representative of the pixel feature includes a feature value vector consisting of an intensity gradient value of the pixel and an intensity multi-scale mean value of the pixel, and an angular feature value vector consisting of an angular feature value extracted from the pixel. The Sparse Bayesian Classification model containing values related to image features corresponding to the border includes a Sparse Bayesian Classification model containing related vectors of image features corresponding to the border.

The Sparse Bayesian Classification model containing related vectors of image features corresponding to the border includes one that is obtained by inputting the feature value vector related to the pixel feature extracted from each of the pixels in the image region containing the border into a Sparse Bayesian Classification model and performing calculation thereon.

In one or more embodiments of this disclosure, a Sparse Bayesian model is configured on the basis that the probability of the feature value vector relative to a related vector representative of features of border pixels of various image regions satisfies the Bernoulli distribution, and the Sparse Bayesian Classification model containing related vectors of image features corresponding to the border is obtained by inputting a feature value vector related to features of each of the pixels in the image region containing the border extracted from the pixel into a Sparse Bayesian Classification model and performing calculation thereon. The feature value vector consists of a plurality of feature values related to a pixel in a predefined image region that are extracted from the pixel or from an image region containing various image region borders, and includes an intensity gradient value vector of a pixel consisting of a plurality of intensity gradient values of the pixel, an intensity multi-scale mean value vector of a pixel consisting of a plurality of intensity multi-scale mean values of the pixel, or an angular feature value vector of a pixel consisting of a plurality of angular feature values related to the angle of the pixel, that are extracted by using the method in Step 202.

The Sparse Bayesian Classification model containing related vectors of image features corresponding to the border includes:

$$p(\tilde{t}=1|w)=\sigma\{y(\tilde{x};w)\}=\sigma[\Sigma_{i=1}^{N_r}w_i K(x,x_i)+w_0],$$

where $x_i$ includes related vectors of features of border pixels of various image regions, $w_i$ is a weight corresponding to a related vector $x_i$, $K(x,x_i)$ is a kernel function, $N_r$ is the number of the related vectors $x_i$, $w_0$ is a preset weight, $\sigma(y)=1/(1+e^{-y})$, $y=[\Sigma_{i=1}^{N_r}w_i K(x, x_i)+w_0]$, x is an input feature value vector, and $w_i$ and $x_i$ include values obtained by inputting a feature value vector related to the pixel feature extracted from each of the pixels in the image region containing the border into the Sparse Bayesian Classification model and performing calculation thereon.

The Sparse Bayesian Classification model containing related vectors of image features corresponding to the border is configured to obtain the probability that the image feature of the pixel belongs to features of various image region borders based on the input feature value vector related to the pixel.

The Sparse Bayesian Classification model containing related vectors of image features corresponding to the border is obtained by the following steps.

Step 402: extracting feature value vectors of all the pixels in a second predefined region containing borders of various image regions.

In one or more embodiments of this disclosure, feature value vectors of all the pixels in a second predefined region containing borders of various image regions are extracted. Borders of various image regions are borders in the Sparse Bayesian Classification model that contains related vectors of image features corresponding to the border. A plurality of feature values related to a pixel in the second predefined region are extracted from the pixel to obtain a feature value vector representative of the pixel feature. The feature value vectors of all the pixels in the second predefined region constitute a sample. The second predefined region is predefined based on the number of the optical coherence tomography images to be segmented. The larger the number of the images to be segmented, the larger the number of the sample images to be extracted from the images to be segmented. The second predefined region is made up of image regions to be segmented from each sample image.

If the optical coherence tomography images to be segmented are 50 identical images, and the 50 images include the same class of borders, then the second predefined region is made up of image regions in which two of the images are to be segmented.

Feature value vectors of all the pixels in the second predefined region including borders of various image regions are extracted to obtain samples. Assume that the sample set is $\{x_n, t_n\}_{n=1}^N$, where $x_n \in R^d$ is a feature value vector extracted from a pixel in the second predefined region, and $t_n \in \{0, 1\}$ is a class label. The sample contains five borders. The class label is used for distinction between Sparse Bayesian Classification models containing related vectors of image features corresponding to the border for various borders in the process of obtaining borders. When one of the labels is used for classification, the label of said border is set to 1, and the label of the region border is set to 0. The feature value vector may be at least one of an intensity gradient value vector of a pixel consisting of a plurality of intensity gradient values of the pixel, an intensity multi-scale mean value vector of a pixel consisting of a plurality of intensity multi-scale mean values of the pixel, or an angular feature value vector of a pixel consisting of a plurality of angular feature values related to the angle of the pixel, that are extracted by using the method in Step 202.

Step 404: obtaining a Sparse Bayesian model by configuring a classification model on the basis that the probability of the feature value vector relative to a related vector representative of features of border pixels of various image regions satisfies the Bernoulli distribution.

In one or more embodiments of this disclosure, the Sparse Bayesian model is obtained by configuring a classification model on the basis that the probability of the feature value vector relative to a related vector representative of features of border pixels of various image regions satisfies the Bernoulli distribution.

The Sparse Bayesian Classification model is obtained on the basis that the feature value vector of each of the pixels in the sample $x_n$ relative to a feature value vector of border pixels of various feature regions satisfies the Bernoulli distribution:

$$P(t \mid w) = \prod_{n=1}^{N} \sigma\{y(x_n; w)\}^{t_n} [1 - \sigma\{y(x_n; w)\}]^{1-t_n}$$

where $$\sigma(x) = 1/(1 + e^{-x}), \sigma\{y(x_n; w)\}^{t_n} = 1 / (1 + e^{-\{y(x_n;w)\}^{t_n}}),$$

$x_n$ is the feature value vector of the $n^{th}$ pixel in the sample consisting of feature value vectors related to features of each of the pixels contained in the second predefined region extracted from the pixel, N is the number of feature value vectors in the sample, $w_n$ is the weight corresponding to $x_n$, and $t_n=1$;

$y(x_n; w)$ can be calculated by $y(x_n; w) = \sum_{n=1}^{N} w_n K(x, x_n) + w_0$;

where $w_0$ is a preset weight. The optical coherence tomography image contains a plurality of borders, and t is a predefined class of borders. In processing of this class, the label t of said class is set to 1, and in processing of another class of borders, the label t of this class is set to 0.

In this equation, $w_n$ is the weight, and $K(x,x_n)$ is the kernel function, which in the present invention is a Gaussian kernel function in the formula of $$K(x_1, x_2) = \exp\{-\gamma \|x_1 - x_2\|_2^2\}.$$

$X_1$ and $X_2$ are two parameters of the kernel function, and $\gamma$ is a preset value.

The optical coherence tomography image contains a plurality of borders, and t is a predefined class of borders. In processing of this class, the label t of said class is set to 1, and in processing of another class of borders, the label t of this class is set to 0.

Step 406: setting the weight to satisfy a Gaussian probability distribution having a mean value of zero, and performing Laplace Theoretical Approximation on the Gaussian probability distribution of the weight $w_n$. Based on the feature value vector $x_n$ related to the feature of each of the pixels contained in the second predefined region extracted from the pixel, a non-zero weight $w_n$ and a feature value vector corresponding to the non-zero $w_n$ are obtained.

In one or more embodiments of this disclosure, the weight $w_n$ is set to satisfy a Gaussian probability distribution having a mean value of zero, and Laplace Theoretical Approximation is performed on the Gaussian probability distribution of the weight $w_n$, to obtain an iterative formula related to $x_n$. The feature value vector $x_n$ extracted from the pixel in the second predefined region is input into the iterative formula, to obtain a non-zero $w_n$ and a feature value vector corresponding to the non-zero $w_n$. The feature value vector corresponding to a non-zero $w_n$ is the related vector $x_i$ containing image features corresponding to the border, and the weight $w_n$ for the related vector $x_i$ is $w_i$.

Let the weight $w_n$ satisfy a Gaussian probability having a mean value of zero, a related vector containing image features corresponding to the border and a weight for the related vector are obtained.

To improve the segmentation efficiency and prevent overfitting, let the weight $w_n$ satisfy a Gaussian probability distribution having the mean value of zero:

$$p(w|\alpha) = \Pi_{n=0}^{N} \mathcal{N}(w_n|0, \alpha_n^{-1}),$$

Laplace Theoretical Approximation is performed on the Gaussian probability distribution of the weight $w_n$, to obtain an iterative formula:

$$\begin{cases} \alpha_j^{new} = \dfrac{\gamma_j}{w_{MP}^2} \\ (\sigma^2)^{new} = \dfrac{\|t - \Phi\mu\|^2}{N - \sum_{j=0}^{N} \mu_j} \\ \gamma_j = 1 - \alpha_j \sum_{j,j} \end{cases}$$

where $\mu = w_{MP} = \Sigma \Phi^T Bt$, $\Phi$ is the structure matrix of $N \times (N+1)$, that is $$\Phi = [\phi(x_1), \phi(x_2), \ldots, \phi(x_N)]^T,$$

$\phi(x_n) = [1, K(x_n, x_1), K(x_n, x_2), \ldots, K(x_n, x_N)]$, $B = \text{diag}(\beta_1, \beta_1, \ldots, \beta_N)$ is a diagonal matrix, where $\beta_n = \sigma\{y(x_n)\}[1 - \sigma\{y(x_n)\}]$, $\Sigma = (\Phi^T B \Phi + A)^{-1}$, and $\Sigma_{j,j}$ is the $j^{th}$ diagonal element in the matrix. N is the number of the feature value vectors contained in the sample $x_n$.

The feature value vector in the sample $x_n$ is substituted into the iterative formula to calculate a non-zero $w_j$ and a sample corresponding to the non-zero $w_j$, that is, the related vector $x_i$ containing image features corresponding to the border, and $w_j$ is the weight $w_i$ for the related vector $x_i$.

Step 408: substituting the related vector $x_i$ containing image features corresponding to the border for the feature value vector $x_n$ in the Sparse Bayesian Classification model, and substituting the weight $w_i$ corresponding to the related vector $x_i$ for $w_n$ corresponding to the feature value vector, to obtain a Sparse Bayesian Classification model containing related vectors of the image features corresponding to the border.

In one or more embodiments of this disclosure, the related vector $x_i$ containing image features corresponding to the border is substituted for the feature value vector $x_n$ in the Sparse Bayesian Classification model, and the weight $w_i$ corresponding to the related vector $x_i$ is substituted for $w_n$ corresponding to the feature value vector, to obtain a Sparse Bayesian Classification model containing related vectors of the image features corresponding to the border. The related vector $x_i$ containing image features corresponding to the border and the weight $w_i$ corresponding to the related vector $x_i$ are substituted into the equation:

$$P(t \mid w) = \prod_{n=1}^{N} \sigma\{y(x_n; w)\}^{t_n} [1 - \sigma\{y(x_n; w)\}]^{1-t_n}$$

Let the class label $t=1$ and perform relevant processing to obtain a Sparse Bayesian Classification model containing related vectors of image features corresponding to the border:

$$p(\tilde{t}=1 \mid w) = \sigma\{y(\tilde{x};w)\} = \sigma[\Sigma_{i=1}^{N_r} w_i K(x,x_i) + w_0]$$

$x_i$ includes the related vectors representative of features of border pixels of various image regions, $w_i$ is the weight corresponding to the related vector $x_i$, $K(x,x_i)$ is a kernel function, $N_r$ represents the number of the related vectors $x_i$, $\sigma(y)=1/(1+e^{-y})$, $y=[\Sigma_{i=1}^{N_r} w_i K(x, x_i) + w_0]$, and x is the input feature value vector. $w_0$ is a preset value. A Gaussian kernel function is used as $K(x,x_i)$.

Step 304: extracting a plurality of feature values related to a pixel in the optical coherence tomography image from the pixel to obtain a feature value vector representative of the pixel feature.

In one or more embodiments of this disclosure, a plurality of feature values related to a pixel in the optical coherence tomography image are extracted from the pixel to obtain a feature value vector representative of the pixel feature. The plurality of feature values related to a pixel in the optical coherence tomography image extracted from the pixel include at least one of an intensity gradient value of the pixel, an intensity multi-scale mean value of the pixel, and an angular feature value extracted from the pixel, and the feature value vector representative of the pixel features includes at least one of a feature value vector consisting of an intensity gradient value of the pixel and an intensity multi-scale mean value of the pixel, and an angular feature value vector consisting of an angular feature value extracted from the pixel.

The feature value vector obtained based on the extracted feature value of the pixel corresponds to the related vector in the obtained Sparse Bayesian Classification model containing the related vector of the image features corresponding to the border.

Step 306: inputting the extracted feature value vector into the Sparse Bayesian Classification model containing the related vectors of the image features corresponding to the border, to obtain the probability that the image feature belongs to border features of various image regions.

In one or more embodiments of this disclosure, the extracted feature value vector is input into the Sparse Bayesian Classification model containing the related vectors of the image features corresponding to the border, to obtain the probability that the image feature belongs to border features of various image regions.

Step 308: obtaining the border of various image regions contained in the predefined image region based on the probability obtained for various pixels in the predefined image region.

Figure 5:
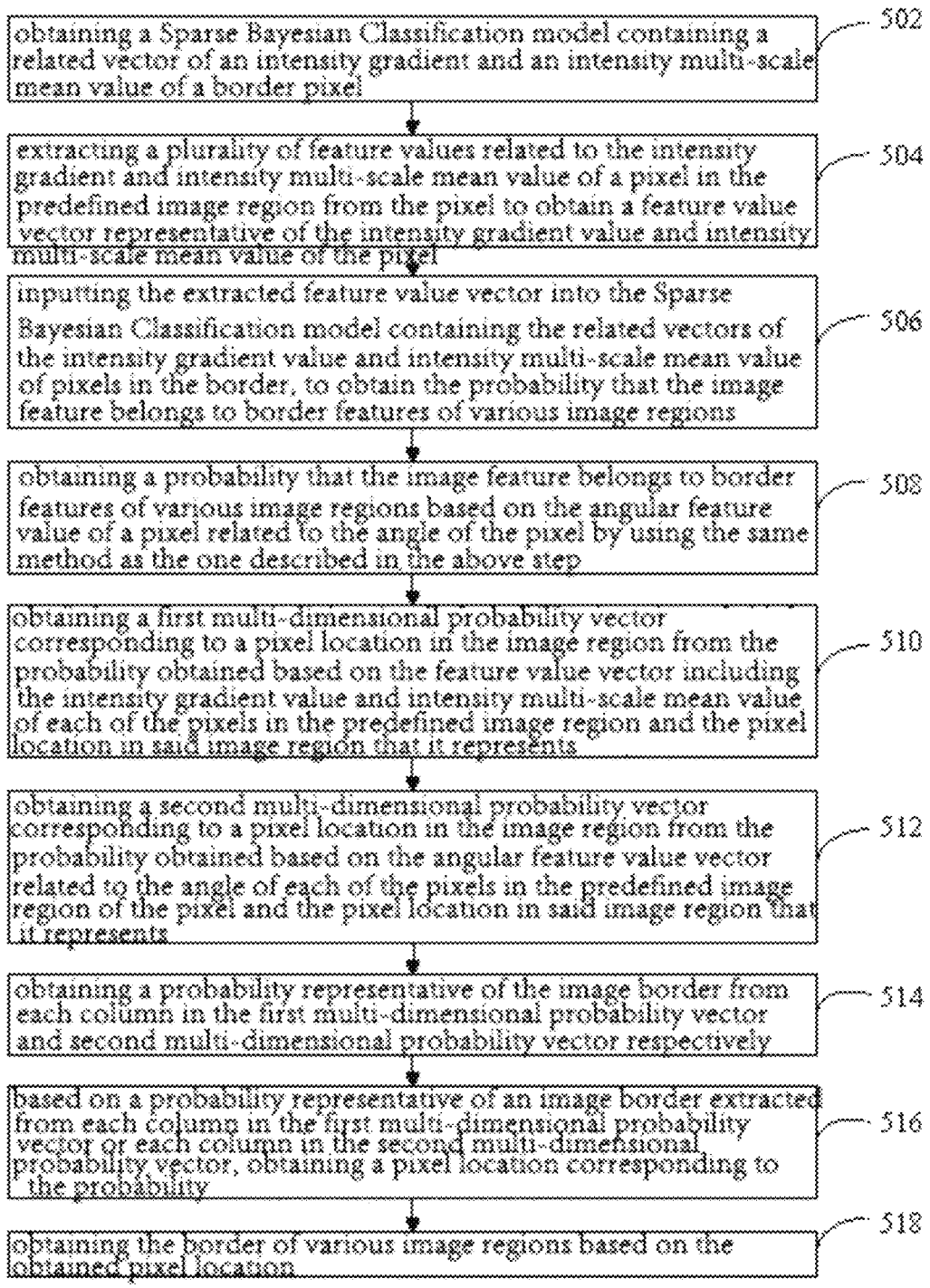
FIG. 5 is a flowchart of a method for quick segmentation of an optical coherence tomography image according to an embodiment of this disclosure.

An embodiment of this disclosure further provides a method for quick segmentation of an optical coherence tomography image as shown in FIG. 5, including Steps 502 to 518:

Step 502: obtaining a Sparse Bayesian Classification model containing a related vector of an intensity gradient and an intensity multi-scale mean value of a border pixel.

In one or more embodiments of this disclosure, a Sparse Bayesian Classification model containing a related vector of an intensity gradient and an intensity multi-scale mean value of a border pixel is obtained.

In this embodiment, there are five borders and it is required to obtain five Sparse Bayesian Classification models containing related values of image features corresponding to one of the borders.

In Step 402, an intensity gradient value and intensity multi-scale mean value of each of the pixels in the second predefined region are extracted by using the method in Step 202 to obtain a sample set $x_w$ of vectors of an intensity gradient value and intensity multi-scale mean value of the pixels. The scale d of each of the pixels in the sample $x_w$ is set to 4, to obtain an intensity gradient value and intensity multi-scale mean value of a pixel in 8 dimensions for one pixel, which then constitute a feature value vector in the form of:

$$z_{ga} = [h^0(y), g^0(y), h^1(y), g^1(y), \ldots, h^4(y), g^4(y)]$$

A Sparse Bayesian Classification model containing related vector $x_m$ of image features corresponding to one border and a corresponding weight $w_m$ is obtained by using Steps 403 to 408 described above:

$$p(\tilde{t}=1 \mid w) = \sigma\{y(\tilde{x};w)\} = \sigma[\Sigma_{m=1}^{N_r} w_m K(x,x_m) + w_0]$$

$x_m$ includes related vectors representative of an intensity gradient and an intensity multi-scale mean value of pixels in a border of various image regions, $w_m$ is a weight corresponding to the related vector $x_m$, $K(x,x_m)$ is a kernel function, $N_r$ represents the number of the related vectors $x_m$, and $w_0$ is a preset weight, $\sigma(y)=1/(1+e^{-y})$, $y=[\Sigma_{m=1}^{N_r} w_m K(x, x_m) + w_0]$, where x is an input feature value vector, and $x_m$ and the corresponding $w_m$ correspond to the input feature value vector x.

Step 504: extracting a plurality of feature values related to the intensity gradient and intensity multi-scale mean value of a pixel in the predefined image region from the pixel to obtain a feature value vector representative of the intensity gradient value and intensity multi-scale mean value of the pixel.

In one or more embodiments of this disclosure, a plurality of feature values related to an intensity gradient and intensity multi-scale mean value of a pixel in the predefined image region are extracted from the pixel to obtain a feature value vector representative of the intensity gradient value and intensity multi-scale mean value of the pixel. The extracted feature values include, but not limited to, an intensity gradient value and an intensity multi-scale mean value of each of the pixels. The feature value vector extracted from one pixel corresponds to the related vector of the image features corresponding to the border as mentioned in the above step. The constituted feature value vector is in the form of $f_{ga}=[h^0(y), g^0(y), h^1(y), g^1(y), \ldots, h^4(y), g^4(y)]$.

Step 506: inputting the extracted feature value vector into the Sparse Bayesian Classification model containing the related vectors of the intensity gradient value and intensity multi-scale mean value of pixels in the border, to obtain the probability that the image feature belongs to border features of various image regions.

In one or more embodiments of this disclosure, the extracted feature value vector is input into the Sparse Bayesian Classification model containing the related vectors of the intensity gradient value and intensity multi-scale mean value of pixels in the border, to obtain the probability that the image feature belongs to border features of various image regions, i.e., to obtain the probability that said pixel belongs to border pixels.

The feature value vector $f_{ga}=[h^0(y), g^0(y), h^1(y), g^1(y), \ldots, h^4(y), g^4(y)]$, is substituted into the Sparse Bayesian Classification model $p(\tilde{t}=1|w)=\sigma\{y(\tilde{x}; w)\}=\sigma[\Sigma_{m=1}^{N_r} w_m K(x,x_m)+w_0]$ containing the related vectors $x_m$ of image features corresponding to one border and the corresponding weight $w_m$.

The probability that a pixel feature represented by the feature value vector belongs to the border feature of the Sparse Bayesian Classification model containing the related vectors $x_m$ of image features corresponding to one border and the corresponding weights $w_m$ is obtained.

Step 508: obtaining a probability that the image feature belongs to border features of various image regions based on the angular feature value of a pixel related to the angle of the pixel by using the same method as the one described in the above step.

In one or more embodiments of this disclosure, a probability that the image feature belongs to border features of various image regions is obtained based on the angular feature value of a pixel related to the angle of the pixel by using the same method as the one described in the above step.

The angular feature value vector of a pixel related to an angle of the pixel is input into a Sparse Bayesian Classification model containing related vectors of an angle of a border pixel to obtain a probability that the image feature belongs to border features of various image regions by using the same method as the one described in Steps 502 to 506 above.

Calculation is performed with the formula below by using the method in Step 202:

$$f_u = \frac{f_{max}}{\sqrt{2}^u}, u = 0, 1, \ldots U-1$$

$$\theta_v = \frac{v}{V}\pi, v = 0, \ldots, V-1$$

Figure 6:
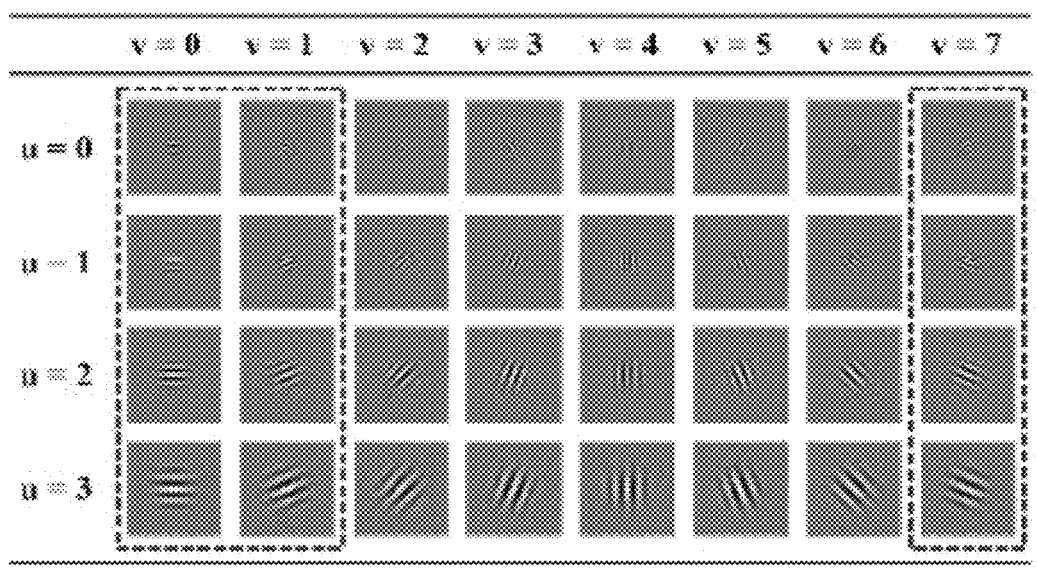
FIG. 6 shows images of angular features of a pixel in a method for quick segmentation of an optical coherence tomography image according to this disclosure.

FIG. 6 shows images of angular features of a pixel. Given v=0-7 and u=0-3, the angular feature values of the pixel are extracted, and then, based on the extracted angular feature values given v=0, 1, and 7 and u=0-3, the probabilities for the angular feature values obtained for the pixel are obtained by using Steps 302 to 306 above.

Given v=0, 1, and 7, indicating the orientations at the angles of $$\theta_v = \frac{1}{8}\pi, \frac{7}{8}\pi,$$

and 0 of the pixel, probabilities are calculated which are the probabilities obtained for the angular feature values at the angles of $$\theta_v = \frac{1}{8}\pi, \frac{7}{8}\pi,$$

and 0 of the pixel.

Step 510: obtaining a first multi-dimensional probability vector corresponding to a pixel location in the image region from the probability obtained based on the feature value vector including the intensity gradient value and intensity multi-scale mean value of each of the pixels in the predefined image region and the pixel location in said image region that it represents.

In one or more embodiments of this disclosure, a first multi-dimensional probability vector corresponding to a pixel location in the image region is obtained from the probability obtained based on the feature value vector including the intensity gradient value and intensity multi-scale mean value of each of the pixels in the predefined image region and the pixel location in said image region that it represents. The extracted feature value vector includes, but not limited to, a feature value vector including the intensity gradient value and the intensity multi-scale mean value of each of the pixels. According to Step 306 above, a probability corresponding to the intensity gradient value and intensity multi-scale mean value of each of the pixels in the predefined image region is obtained. A first multi-dimensional probability vector corresponding to a pixel location in the image region is obtained from the probability obtained based on the intensity gradient value and intensity multi-scale mean value of each of the pixels in the predefined image region and the pixel location in said image region that it represents.

Step 512: obtaining a second multi-dimensional probability vector corresponding to a pixel location in the image region from the probability obtained based on the angular feature value vector related to the angle of each of the pixels in the predefined image region of the pixel and the pixel location in said image region that it represents.

In one or more embodiments of this disclosure, a second multi-dimensional probability vector corresponding to a pixel location in the image region is obtained from the probability obtained based on the angular feature value vector related to the angle of each of the pixels in the predefined image region of the pixel and the pixel location in said image region that it represents. The extracted feature value vector includes the angular feature value vector of the angular feature value related to the angle of each of the pixels extracted from the pixel.

Step 308 of obtaining a probability based on an angular feature value related to an angle of $$\theta_v = \frac{1}{8}\pi, \frac{7}{8}\pi,$$

and 0 of the pixel is repeated to obtain a probability for an angular feature value related to an angle of $$\theta_v = \frac{1}{8}\pi, \frac{7}{8}\pi,$$

and 0 of the pixel for each of the pixels in the predefined region. A second multi-dimensional probability vector corresponding to a pixel location in the image region is obtained from the probability obtained based on the angular feature value related to an angle of $$\theta_v = \frac{1}{8}\pi, \frac{7}{8}\pi,$$

and 0 of the pixel for each of the pixels in the predefined image region and the pixel location in the image region that it represents.

Step 514: obtaining a probability representative of the image border from each column in the first multi-dimensional probability vector and second multi-dimensional probability vector respectively.

In one or more embodiments of this disclosure, a probability representative of the image border is extracted from each column in the first multi-dimensional probability vector and each column in the second multi-dimensional probability vector respectively.

The probability representative of the image border contained in each column in the first multi-dimensional probability vector or second multi-dimensional probability vector includes a maximum or minimum probability in each column of probabilities.

Step 516: based on a probability representative of an image border extracted from each column in the first multi-dimensional probability vector or each column in the second multi-dimensional probability vector, obtaining a pixel location corresponding to the probability.

Figure 7:
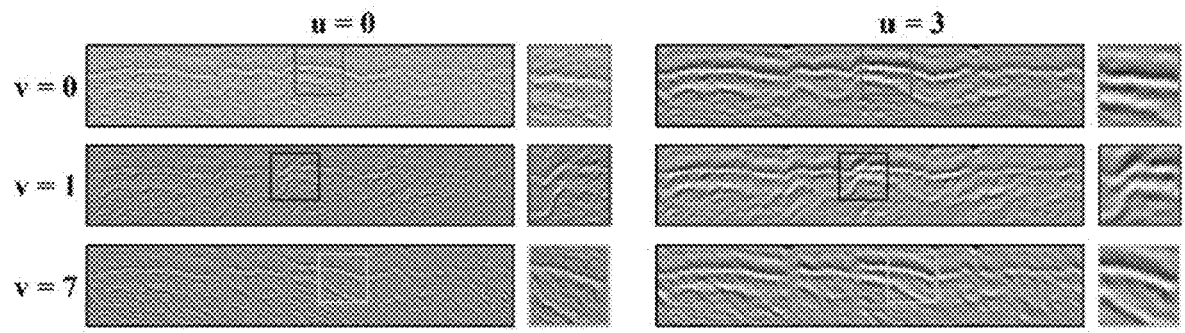
FIG. 7 shows images of borders obtained based on an angular feature value vector and a feature value vector of a pixel in a method for quick segmentation of an optical coherence tomography image according to this disclosure.

In one or more embodiments of this disclosure, based on a probability representative of an image border extracted from each column in the first multi-dimensional probability vector or the second multi-dimensional probability vector, a pixel location corresponding to the probability is obtained. The border images thus obtained are shown in FIG. 7.

Step 518: obtaining the border of various image regions based on the obtained pixel location.

In one or more embodiments of this disclosure, the border of various image regions is obtained based on the obtained pixel location, and the pixel location thus obtained is the desired border of various image regions.

Figure 8:
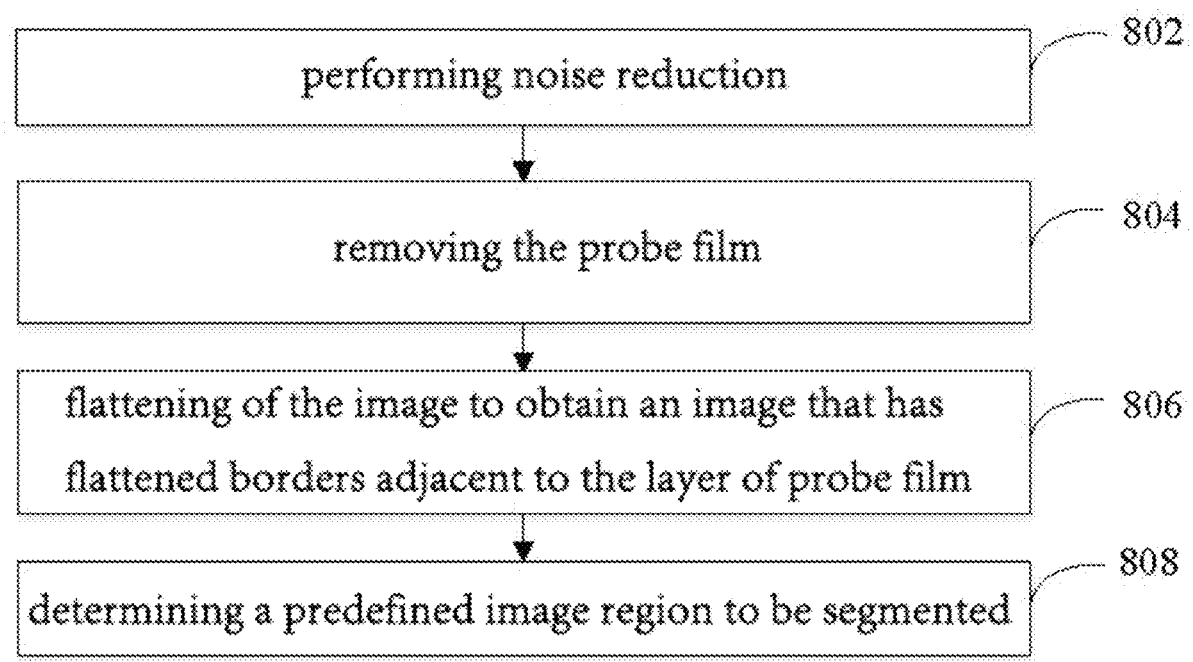
FIG. 8 is a flowchart of image preprocessing in a method for quick segmentation of an optical coherence tomography image according to an embodiment of this disclosure.

In this disclosure, there are five borders contained in an optical coherence tomography image of a lumen obtained through optical coherence tomography that need segmentation. The optical coherence tomography image needs to be preprocessed before segmentation of the five borders. The preprocessing, as shown in FIG. 8, includes Steps 802 to 808.

Step 802: performing noise reduction.

Figure 9:
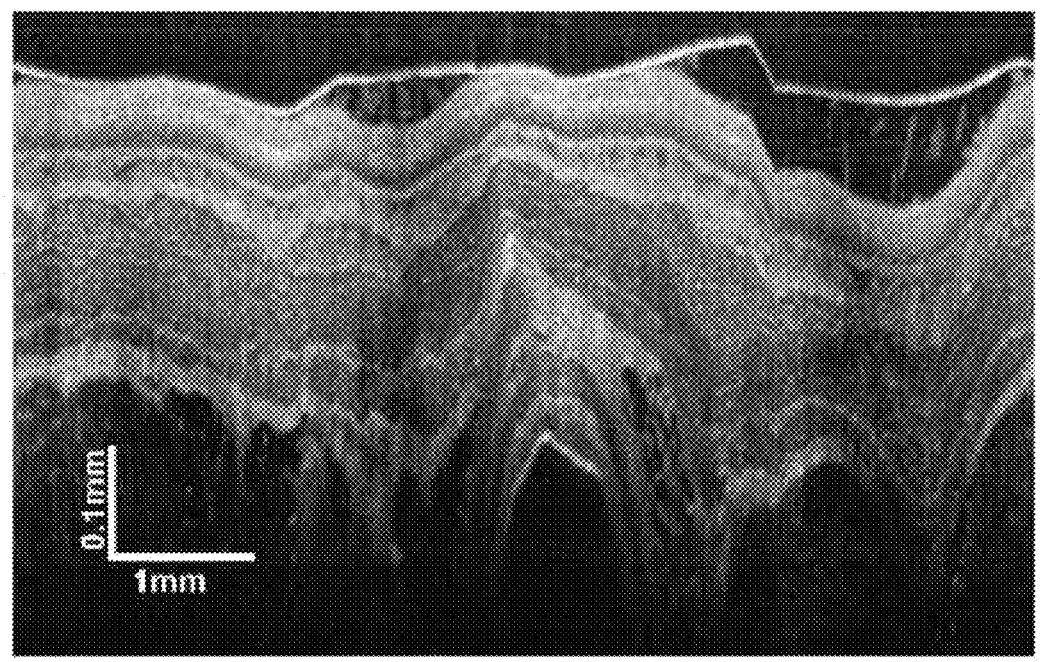
FIG. 9 shows an image that has not been processed in a method for quick segmentation of an optical coherence tomography image according to an embodiment of this disclosure.

The experimental data includes endoscopic optical coherence tomography images of the esophagus of a live guinea pig. An example of the images is shown in FIG. 9. First, noise reduction is performed on all the images. Noise reduction of the image is performed by a median filter to obtain a sharp image.

Step 804: removing the probe film.

The optical coherence tomography image region to be segmented in the optical coherence tomography image of a lumen is adjacent to a layer of probe film. The probe film needs to be removed from the image before segmentation of the image.

The upper and lower borders of the probe film are positioned through Graph Cut. The optical coherence tomography image $I \in R^{M \times N}$ is transformed into a graph G(V,E), where V represents vertex pixels of the graph. Adjacent vertex pixels are connected by a side E. Given adjacent pixels a and b, the side connecting the two points is given a weight of:

$$W_{(i,j)-(m,n)} = 2 - (g_a + g_b) + w_{min}$$

where $g_a$ and $g_b$ represent gradient values of the pixels in the vertical direction, and $w_{min}$ is a preset minimum weight ensuring that the side connecting the two points has a weight greater than zero. Dynamic Programming is performed on the constructed graph G(V,E) to search for a path with a minimum weight and thus obtain the segmentation results. For the lower border of the probe film, a depth of the probe film is preliminarily measured as d pixels, and then the upper edge of the probe film thus obtained is used as the upper border L1, which is shifted downward by d pixels to get a lower border L2. The lower edge of the probe film is positioned in this region through Graph Cut. Finally, the pixel values between the upper and lower edges of the probe film are removed and background pixels are shifted to fill up the pixel values in this interval.

Step 806: flattening of the image to obtain an image that has flattened borders adjacent to the layer of probe film.

Flattening is intended to suppress adverse effects on the segmentation resulting from elastic deformation produced by the esophageal tissue during imaging and other irregular structures. Since the tissue layers have the same curvature trend, the border of one layer can be selected as the baseline to flatten the entire esophageal tissue. The image with the probe film removed has a border adjacent to the layer of probe film that is sharp relative to other borders, which can be used as the baseline for flattening. The specific operation of flattening is as follows. First, the border adjacent to the layer of probe film is extracted through Graph Cut as the baseline for flattening. Then the baseline is divided into several segments. An image region corresponding to each segment in the vertical direction in the image is extracted through Graph Cut. Then the image regions are sliced together to obtain a flattened image.

Step 808: determining a predefined image region to be segmented.

5 to 195 pixels are selected from the region to be segmented in the direction perpendicular to the border adjacent to the layer of probe film as the predefined image region.

The second predefined region in Steps 402 to 406 includes all or some of the regions in the predefined image region.

Borders of various image regions contained in the predefined image region are then obtained by using Steps 202 to 208 or 502 to 516 described above, to complete segmentation of various image regions contained in the predefined image region and obtain the borders.

Figure 10:
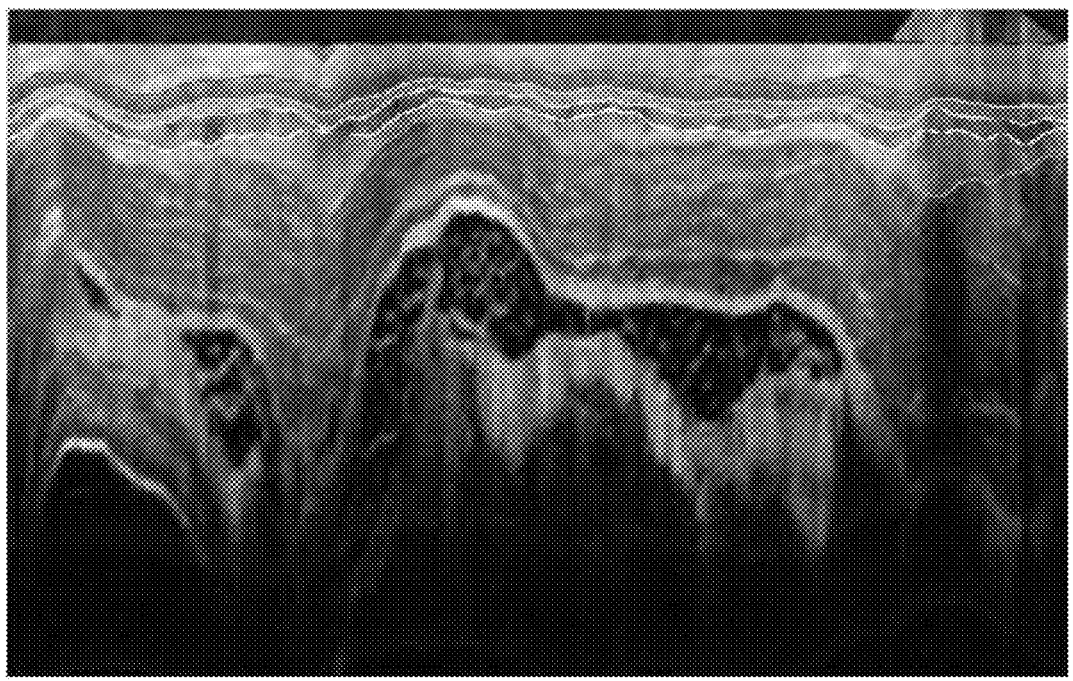
FIG. 10 shows an image of borders of various image regions after segmentation in a method for quick segmentation of an optical coherence tomography image according to an embodiment of this disclosure.

It is assumed that the predefined image region contains six different image regions with five borders. Therefore, Steps 202 to 208 or 502 to 518 are repeated five times to complete extraction of the five borders and obtain the borders shown in FIG. 10.

Borders of various image regions obtained through segmentation of an image by using a Sparse Bayesian Classification model containing a related vector of image features corresponding to the border suffer from problems such as deviation and breakage. Therefore, the borders of various image regions require result optimization.

The steps of result optimization are as follows.

The search region is restricted to within ±6 pixels from the location of the border, then the weight for an adjacent pixel is calculated through Dynamic Planning:

$$W_{ab,t}^{Prob}=2-(P_{a,t}+P_{b,t})+w_{min},$$

where a and b are adjacent pixels, and the results of segmentation can be obtained by searching for the path with a minimum weight through Dynamic Planning.

The results of Dynamic Planning are utilized to complement the deviated or broken portions in the borders of various image regions obtained from segmentation of the image by using the Sparse Bayesian Classification model containing related vectors of image features corresponding to the border.

The table below shows statistics of deviation of the resultant border locations obtained from segmentation of various image regions by using a Sparse Bayesian Classification model containing related vectors of image features corresponding to the border in Steps 502 to 518 and the step of result optimization from the manually marked border locations and statistics of deviation of the resultant border locations obtained through segmentation of various image regions through SVM, a Random Forest Classifier, and Graph Cut from the manually marked border locations respectively.

| Border | Proposed method | SVM | Random Forest | Graph Cut |
|---|---|---|---|---|
| B1 (μm) | 2.46 ± 0.88 | 2.48 ± 0.91 | 2.44 ± 0.73 | 2.47 ± 0.93 |
| B2 (μm) | 2.07 ± 1.66 | 3.72 ± 2.02 | 1.91 ± 1.53 | 4.58 ± 2.32 |
| B3 (μm) | 0.22 ± 0.80 | 1.21 ± 1.33 | 0.31 ± 1.09 | 1.92 ± 1.89 |
| B4 (μm) | 0.66 ± 0.97 | 1.87 ± 1.67 | 1.10 ± 1.12 | 2.11 ± 2.08 |
| B5 (μm) | 3.44 ± 2.23 | 4.11 ± 3.28 | 3.22 ± 2.34 | 5.03 ± 4.06 |
| B6 (μm) | 1.31 ± 1.08 | 2.20 ± 1.84 | 2.05 ± 1.69 | 2.51 ± 2.10 |

In the table above, B1, B2, B3, B4, and B5 represent respectively five borders of various image regions to be segmented contained in the predefined image region. As seen from the table above, the border locations obtained from segmentation of various image regions by using a Sparse Bayesian Classification model containing related vectors of image features corresponding to the border and the step of result optimization are more accurate than those obtained through SVM, Random Forest, and Graph Cut.

The proposed method in the table is a method that uses a Sparse Bayesian Classification model containing related vectors of image features corresponding to the border and the step of result optimization.

The table below shows the comparison between the time of segmentation using a Sparse Bayesian Classification model containing related vectors of image features corresponding to the border and the step of result optimization and the time of segmentation through SVM, Random Forest, and Graph Cut.

| Method | Proposed method | SVM | Random Forest | Graph Cut |
|---|---|---|---|---|
| Time (S) | 1.71 ± 0.13 | 12.24 ± 2.08 | 7.82 ± 1.11 | 10.01 ± 1.84 |

The proposed method in the table is a method that uses a Sparse Bayesian Classification model containing related vectors of image features corresponding to the border in Steps 502 to 518 and the step of result optimization for segmentation of various image regions to obtain the border locations. As seen from the table above, the time of segmentation using a Sparse Bayesian Classification model containing related vectors of image features corresponding to the border and the step of result optimization is less than the time of segmentation through SVM, Random Forest, and Graph Cut.

Therefore, use of a Sparse Bayesian Classification model containing related vectors of image features corresponding to the border can improve the efficiency and accuracy in segmentation of an optical coherence tomography image.

Figure 11:
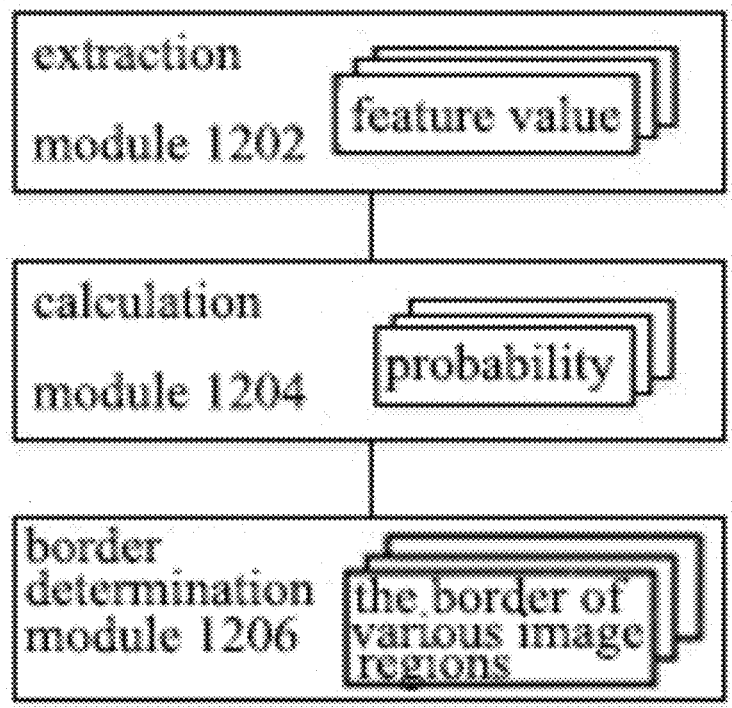
FIG. 11 is a schematic drawing of a device for quick segmentation of an optical coherence tomography image according to an embodiment of this disclosure.

This disclosure further provides a device for quick segmentation of an optical coherence tomography image, which as shown in FIG. 11, includes an extraction module 1202, a calculation module 1204, and a border determination module 1206.

The extraction module 1202 is configured to extract a feature value related to a pixel in the optical coherence tomography image from the pixel to obtain a feature value representative of the pixel feature, the extracted feature value including at least one of an intensity gradient value of the pixel, an intensity multi-scale mean value of the pixel, and an angular feature value extracted from the pixel.

In one or more embodiments of this disclosure, the intensity multi-scale mean value of the pixel is the mean value of $2^d$ pixels surrounding said pixel as the center along a particular direction, such as a vertical or horizontal direction. The extraction module 1202 calculates the intensity multi-scale mean value of the pixel by using the equation for calculating the intensity multi-scale mean value of the pixel of:

$$h^d = \frac{1}{2^d}\sum_{\Delta y=1-2^{d-1}}^{1+2^{d-1}} I(y+\Delta y),$$

where d is a natural number greater than zero. The extraction module 1202 also calculates the intensity gradient value by using the equation for calculating the intensity gradient value of the pixel at a corresponding scale of:

$$g^d(y)=h^d(y+2^{d-1})-h^d(y-2^{d-1}).$$

Specifically, $h^0(y)=I(y)$, $g^0(y)=I(y+1)-I(y)$.

The intensity gradient value of the pixel or the intensity multi-scale mean value of the pixel can be obtained by assuming d in the extraction module 1202 as a particular natural number.

In one or more embodiments of this disclosure, the intensity gradient value of the pixel describes the variation in intensity of the pixels along a particular direction, such as a vertical or horizontal direction. However, various regions in the image have a border that is generally curved and deviated from the particular direction by a small angle. Therefore, the intensity gradient value and the intensity multi-scale mean value of the pixel along the particular direction are not sufficient for characterizing the features of the pixel, and the angular feature value related to the angle of the pixel also needs to be extracted. The angular feature value extracted from the pixel includes a feature value extracted along a direction that is deviated from the particular direction, such as the vertical or horizontal direction, of the pixels, by a predefined angle.

The extraction module 1202 is further configured to extract an angular feature from the pixel, including angular features related to the angle of the pixel extracted by using Gabor wavelet transform, Haar wavelet transform, or Daubechies wavelet transform. In an example of Gabor wavelet transform, The extraction module 1202 extracts an angular feature value from the pixel by using a discretized Gabor function $\{G_{f_u,\theta_v}\}$:

$$f_u = \frac{f_{max}}{\sqrt{2}^u}, u = 0, 1, \ldots U-1$$

$$\theta_v = \frac{v}{V}\pi, v = 0, \ldots, V-1,$$

where u and v are respectively a scale parameter for a distance from the central point of the pixel and an angular parameter related to the central line of the pixel of a Gabor wavelet, $f_{max}$ is the maximum center frequency, and is a preset value. The feature of the Gabor wavelet depends on both the angular parameter and the scale parameter. Adjustments to the angular parameter enables matching of various angular features related to the angle of the pixel, and adjustments to the scale parameter enables multi-resolution analysis of the pixel.

By assuming v in the extraction module 1202 as a particular natural number, an angular feature value can be obtained for the pixel at a particular angle.

The calculation module 1204 is configured to input the extracted feature value into a Sparse Bayesian Classification model containing values related to image features corresponding to the border, to obtain a probability that the image feature belongs to border features of various image regions. The Sparse Bayesian Classification model containing values related to image features corresponding to the border includes one that is obtained by inputting feature values related to each of the pixels in the image region containing the border extracted from the pixel into a Sparse Bayesian Classification model and performing calculation thereon. The Sparse Bayesian Classification model is a mathematical calculation model that performs calculation on a feature value extracted from a pixel and a value related to the border feature value to obtain the probability that the image feature belongs to border features of various image regions. The feature value input into the Sparse Bayesian Classification model corresponds to the value related to the border feature value contained in the Sparse Bayesian Classification model.

In one or more embodiments of this disclosure, the calculation module 1204 is further configured to input the intensity gradient value of the pixel into the Sparse Bayesian Classification model containing a value related to the intensity gradient of the border to obtain a probability that the intensity gradient of the pixel belongs to the intensity gradient of the border.

In one or more embodiments of this disclosure, the calculation module 1204 is further configured to input the intensity multi-scale mean value of the pixel into the Sparse Bayesian Classification model containing a value related to the intensity of a border pixel, to obtain a probability that the pixel intensity of the pixel belongs to the intensity of a border pixel.

In one or more embodiments of this disclosure, the calculation module 1204 is further configured to input the angular feature value extracted from the pixel into the Sparse Bayesian Classification model containing values related to a corresponding angle of a border pixel of a border extracted from the border pixel, to obtain a probability that the angular feature of the pixel extracted from the pixel belongs to the angular features related to the corresponding angle of the border pixel of the border extracted from the border pixel.

In one or more embodiments of this disclosure, the calculation module 1204 is further configured to input the feature value of each of the pixels in the predefined image region into the Sparse Bayesian Classification model containing values related to the border features, to obtain the probability for each of the pixels in the predefined image region.

The border determination module 1206 is configured to obtain borders of various image regions contained in the predefined image region based on the probability for each of the pixels in the predefined image region.

In one or more embodiments of this disclosure, the border determination module 1206 is further configured to, if the probability for each of the pixels in the image region is within a data range, set the pixel as a border pixel of various image regions, and obtain borders of various image regions based on the obtained border pixels of various image regions. The data range here is greater than 0.95 or less than 0.1.

Figure 12:
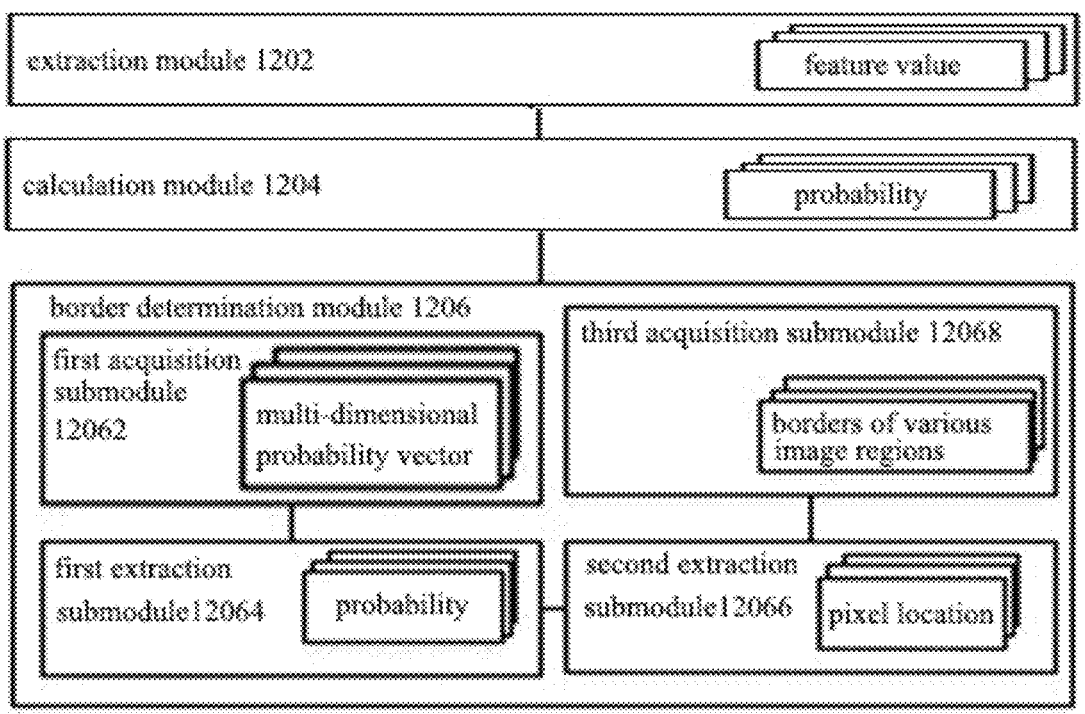
FIG. 12 is a schematic drawing of a device for quick segmentation of an optical coherence tomography image according to an embodiment of this disclosure.

In one or more embodiments of this disclosure, as shown in FIG. 12, the border determination module 1206 further includes:

A first acquisition submodule 12062, configured to obtain a multi-dimensional probability vector corresponding to a pixel location in the predefined image region based on the probability for each of the pixels in the image region and its pixel location. The first acquisition submodule 12062 arranges the probabilities for all the pixels in the predefined image region into a multi-dimensional probability vector corresponding to pixel locations in the image region based on the pixel locations.

A first extraction submodule 12064, configured to extract a probability representative of a border location from the multi-dimensional probability vector depending on the shapes of various image region borders to be extracted.

In one or more embodiments of this disclosure, if the various image region borders to be extracted are perpendicular to a column of the multi-dimensional probabilities, the first extraction submodule 12064 is configured to obtain the pixel location corresponding to the maximum or minimum probability in each column in the probability vector based on the probabilities extracted from said column.

In one or more embodiments of this disclosure, if the borders of various image regions to be extracted are parallel to a column of the multi-dimensional probabilities, then the first extraction submodule 12064 is configured to obtain the pixel location corresponding to the maximum or minimum probability in each row in the probability vector based on the probabilities extracted from said row. The probability representative of the border location extracted from the multi-dimensional probabilities by the first extraction submodule 12064 includes the maximum or minimum probability in each column or row in the multi-dimensional probability vector.

A second acquisition submodule 12066, configured to obtain the pixel location corresponding to the probability representative of the border location based on said probability, and obtain the pixel location corresponding to the maximum or minimum probability in each column or row in the obtained probability vector based on said maximum or minimum probability.

A third acquisition submodule 12068, configured to obtain borders of various image regions based on the obtained pixel location. The third acquisition submodule 12068 marks the pixel in the predefined image region based on the obtained pixel location to obtain borders of various image regions.

Figure 13:
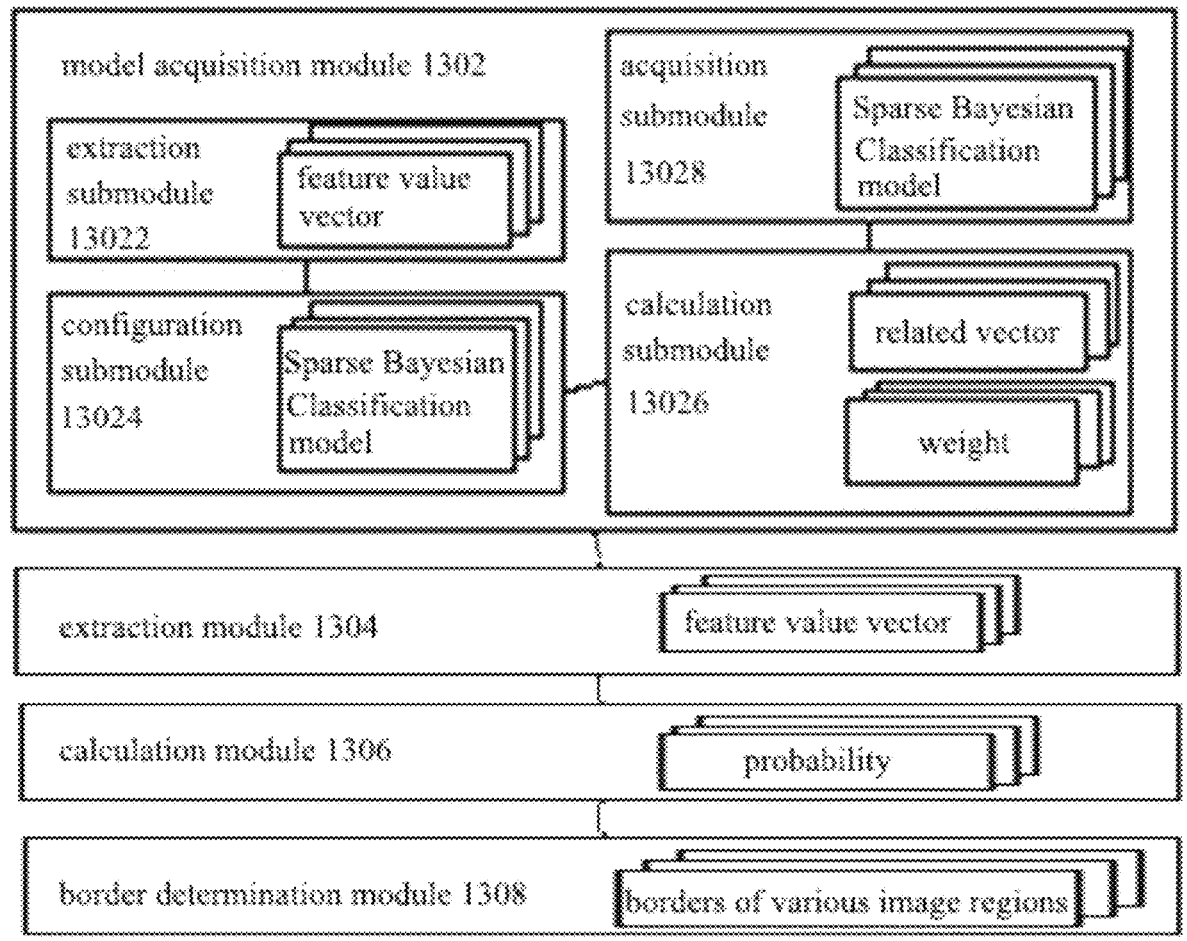
FIG. 13 is a schematic drawing of a device for quick segmentation of an optical coherence tomography image according to an embodiment of this disclosure.

An embodiment of this disclosure provides a device for quick segmentation of an optical coherence tomography image as shown in FIG. 13, including a model acquisition module 1302, an extraction module 1304, a calculation module 1306, and a border determination module 1308.

The model acquisition module 1302 is configured to configure the Sparse Bayesian model on the basis that the probability of said feature value vector relative to a related vector representative of features of border pixels of various image regions satisfies the Bernoulli distribution. The Sparse Bayesian Classification model containing related vectors of image features corresponding to the border is obtained by inputting a feature value vector related to pixel features extracted from each of the pixels in the image region containing the border into a Sparse Bayesian Classification model and performing calculation thereon.

The feature value vector includes a plurality of feature values related to features of a pixel in a predefined image region extracted from the pixel, including an intensity gradient value vector of the pixel consisting of a plurality of intensity gradient values of the pixel, an intensity multi-scale mean value vector of the pixel consisting of a plurality of intensity multi-scale mean values of the pixel, or an angular feature value vector consisting of a plurality of angular feature values related to the angle of the pixel that are extracted by using the method in Step 202. The Sparse Bayesian Classification model containing values related to image features corresponding to the border includes a Sparse Bayesian Classification model containing related vectors of image features corresponding to the border. The plurality of feature values related to a pixel in the optical coherence tomography image extracted from said pixel include at least one of an intensity gradient value of the pixel, an intensity multi-scale mean value of the pixel, and an angular feature value extracted from the pixel. The feature value vector representative of the pixel features includes at least one of a feature value vector consisting of an intensity gradient value of the pixel and an intensity multi-scale mean value of the pixel, and an angular feature value vector consisting of an angular feature value related to the angle of the pixel extracted from the pixel.

The Sparse Bayesian Classification model containing related vectors of image features corresponding to the border includes one that is obtained by inputting the feature value vector related to the pixel feature extracted from each of the pixels in the image region containing the border into a Sparse Bayesian Classification model and performing calculation thereon. The model acquisition module 1302 performs calculation using the Sparse Bayesian Classification model containing related vectors of image features corresponding to the border as described below, extracts a plurality of feature values related to a pixel in the optical coherence tomography image from the pixel to obtain a feature value vector representative of the pixel feature, and inputs the feature value vector into the Sparse Bayesian Classification model containing related vectors of the image features corresponding to the border to obtain a probability that the image features related to the input feature value vector belong to border features of various image regions.

The Sparse Bayesian Classification model containing related vectors of image features corresponding to the border includes:

$$p(\tilde{t}=1|w) = \sigma\{y(\tilde{x};w)\} = \sigma[\Sigma_{i=1}^{N_r} w_i K(x,x_i) + w_0],$$

where $x_i$ includes related vectors of features of border pixels of various image regions, $w_i$ is a weight corresponding to the related vector $x_i$, $K(x,x_i)$ is a Kernel Function, $N_r$ is the number of the related vectors $x_i$, $\sigma(y)=1/(1+e^{-y})$, $y=[\Sigma_{i=1}^{N_r} w_i K(x, x_i) + w_0]$, x is an input feature value vector, and $w_i$ and $x_i$ include values obtained by inputting feature value vectors related to the pixel feature extracted from each of the pixels in the image region containing the border into a Sparse Bayesian Classification model and performing calculation thereon.

The Sparse Bayesian Classification model containing related vectors of image features corresponding to the border is configured to obtain the probability that the image feature of the pixel belongs to features of various image region borders based on the input feature value vector related to the pixel.

The model acquisition module 1302 includes an extraction submodule 13022, a configuration submodule 13024, a calculation submodule 13026, and an acquisition submodule 13028.

The extraction submodule 13022 is configured to extract feature value vectors of all the pixels in a second predefined region containing borders of various image regions.

The extraction submodule 13022 extracts feature value vectors of all the pixels in the second predefined region containing borders of various image regions. The borders of various image regions mean borders in the Sparse Bayesian Classification model containing related vectors of image features corresponding to the borders. The second predefined region may be a predefined image region or part of a predefined image region, or another optical coherence tomography image region containing the borders of various image regions to be segmented. The extraction submodule 13022 extracts a plurality of feature values related to a pixel from all the pixels in the second predefined region and obtains a feature value vector representative of the pixel feature.

The second predefined region is predefined based on the number of the optical coherence tomography images to be segmented. The larger the number of the images to be segmented, the larger the number of the sample images to be extracted from the image to be segmented. The second predefined region is made up of image regions to be segmented from each sample image.

If the optical coherence tomography images to be segmented are 50 identical images, and the 50 images contain the same class of borders, then the second predefined region is made up of image regions of two of the images to be segmented.

The extraction submodule 13022 extracts feature value vectors of all the pixels in the second predefined region containing borders of various image regions to obtain samples. Assume that the sample set is $\{x_n, t_n\}_{n=1}^{N}$, where $x_n \in R^d$ is a feature value vector extracted from a pixel in the second predefined region, $t_n \in \{0, 1\}$ is a class label. For sample contains five borders. The class label is used for distinguishing between Sparse Bayesian Classification models containing related vectors of image features corresponding to the border for various borders in the process of obtaining borders. When one of the labels is used for classification, the label of said border is set to 1, and the label of the region border is set to 0. The feature value vector may be at least one of an intensity gradient value vector of a pixel consisting of a plurality of intensity gradient values of the pixel, an intensity multi-scale mean value vector of a pixel consisting of a plurality of intensity multi-scale mean values of the pixel, an angular feature value vector of a pixel consisting of a plurality of angular feature values related to the angle of the pixel, and a feature value vector consisting of an intensity gradient value and an intensity multi-scale mean value related to an intensity gradient value and an intensity multi-scale mean value of the pixel that are extracted by using the method in Step 202.

The configuration submodule 13024 is configured to obtain the Sparse Bayesian model by configuring a classification model on the basis that the probability of said feature value vector relative to a related vector representative of features of border pixels of various image regions satisfies the Bernoulli distribution.

The configuration submodule 13024 configures the Sparse Bayesian Classification model on the basis that the feature value vector of each of the pixels in the sample $x_n$ obtained by the extraction submodule 13022 relative to a feature value vector of a border pixel of various feature regions satisfies the Bernoulli distribution:

$$P(t \mid w) = \prod_{n=1}^{N} \sigma\{y(x_n; w)\}^{t_n} [1 - \sigma\{y(x_n; w)\}]^{1-t_n}$$

where $$\sigma(x) = 1/(1 + e^{-x}), \sigma\{y(x_n; w)\}^{t_n} = 1/\left(1 + e^{-\{y(x_n;w)\}^{t_n}}\right),$$

$y(x_n;w)$ can be calculated by $$y(x_n;w) = \Sigma_{n=1}^{N} w_n K(x,x_n) + w_0,$$

where $x_n$ is the feature value vector of the $n^{th}$ pixel in the sample consisting of feature value vectors related to features of each of the pixels contained in the second predefined region extracted from the pixel, $w_n$ is the weight corresponding to $x_n$, N is the number of feature value vectors from the sample, and $w_0$ is a preset weight. The optical coherence tomography image contains a plurality of borders, and t is a predefined class of borders. In processing of this class, the label t of said class is set to 1, and in processing of another class of borders, the label t of said class is set to 0, $t_n$=1.

In this equation, $K(x,x_n)$ is a kernel function, which in the present invention is a Gaussian kernel function in the formula of:

$$K(x_1,x_2)=\exp\{-\gamma\|x_1-x_2\|_2^2\},$$

where $X_1$ and $X_2$ are two parameters of the kernel function, and $\gamma$ is a preset value.

The optical coherence tomography image contains a plurality of borders, and t is a predefined class of borders. In processing of this class, the class label t of said class is set to 1, and in processing of another class of borders, the label t of said class is set to 0.

The calculation submodule 13026 is configured to set the weight $w_n$ to satisfy a Gaussian probability distribution having a mean value of zero, and perform Laplace Theoretical Approximation on the Gaussian probability distribution of the weight $w_n$ to obtain an iterative formula related to $x_n$; input the feature value vector $x_n$ extracted from the pixel in the second predefined region into the iterative formula, to obtain a non-zero $w_n$ and a feature value vector corresponding to the non-zero $w_n$. The feature value vector corresponding to a non-zero $w_n$ is the related vector $x_i$ containing image features corresponding to the border, and the weight $w_n$ corresponding to the related vector $x_i$, that is $w_i$.

To improve the segmentation efficiency and prevent overfitting, the calculation submodule 13026 sets the weight $w_n$ to satisfy a Gaussian probability distribution having the mean value of zero:

$$p(w|\alpha)=\Pi_{n=0}^{N} \mathcal{N}(w_n|0,\alpha_n^{-1}).$$

The calculation submodule 13026 performs Laplace Theoretical Approximation on the Gaussian probability distribution of the weight $w_n$, to obtain an iterative formula:

$$\begin{cases} \alpha_j^{new} = \dfrac{y_j}{w_{MP}^2} \\ (\sigma^2)^{new} = \dfrac{\|t - \Phi\mu\|^2}{N - \Sigma_{j=0}^{N}\mu_j} \\ y_j = 1 - \alpha_j \Sigma_{j,j} \end{cases}$$

where $\mu=w_{MP}=\Sigma\Phi^T Bt$, $\Phi$ is the structure matrix of N×(N+1), that is $$\Phi=[\phi(x_1),\phi(x_2),\ldots,\phi(x_N)]^T,$$

$\phi(x_n)=[1, K(x_n, x_1), K(x_n, x_2), \ldots, K(x_n, x_N)]$, B=diag($\beta_1$, $\beta_1$, ..., $\beta_N$) is a diagonal matrix, where $\beta_n=\sigma\{y(x_n)\}[1-\sigma\{y(x_n)\}]$, $\Sigma=(\Phi^T B\Phi+A)^{-1}$, and $\Sigma_{j,j}$ is the $j^{th}$ diagonal element in the matrix. N is the number of the feature value vectors contained in the sample $x_n$, and $\gamma$ is a preset value.

The calculation submodule 13026 substitutes the feature value vector in the sample $x_n$ into the iterative formula to calculate a sample corresponding to the non-zero $w_j$, that is, the related vector $x_i$ containing image features corresponding to the border, and $w_j$ is the weight $w_i$ corresponding to the related vector $x_i$.

The acquisition submodule 13028 is configured to substitute the related vector $x_i$ containing image features corresponding to the border for the feature value vector $x_n$ in the Sparse Bayesian Classification model, and substitute the weight $w_i$ corresponding to the related vector $x_i$ for $w_n$ corresponding to the feature value vector, to obtain a Sparse Bayesian Classification model containing the related vector of image features corresponding to the border.

The acquisition submodule 13028 substitutes the related vector $x_i$ containing image features corresponding to the border and the weight $w_i$ corresponding to the related vector $x_i$ into the equation:

$$P(t \mid w) = \prod_{n=1}^{N} \sigma\{y(x_n; w)\}^{t_n} [1 - \sigma\{y(x_n; w)\}]^{1-t_n}.$$

Then, the acquisition submodule 13028 sets the class label t=1 and performs relevant processing to obtain a Sparse Bayesian Classification model containing related vectors of the image features corresponding to the border:

$$p(\tilde{t}=1|w)=\sigma\{y(\tilde{x};w)\}=\sigma[\Sigma_{i=1}^{N_r} w_i K(x,x_i)+w_0]$$

where $x_i$ includes the related vectors representative of features of border pixels of various image regions, $w_i$ is the weight corresponding to the related vector $x_i$, $K(x,x_i)$ is a kernel function, $N_r$ represents the number of the related vectors $x_i$, $\sigma(y)=1/(1+e^{-y})$, $y=[\Sigma_{i=1}^{N_r}w_iK(x, x_i)+w_0]$, and x is the input feature value vector. $w_0$ is a preset value. A Gaussian kernel function is used as $K(x,x_i)$.

The extraction module 1304 is configured to extract a plurality of feature values related to a pixel in the optical coherence tomography image from the pixel to obtain a feature value vector representative of the pixel feature.

The extraction module 1304 extracts a plurality of feature values related to a pixel in the optical coherence tomography image from the pixel, including, but not limited to, at least one of an intensity gradient value of the pixel, an intensity multi-scale mean value of the pixel, an angular feature value extracted from the pixel, or extracted feature values related to an intensity gradient value and intensity multi-scale mean value of the pixel including an intensity gradient value and intensity multi-scale mean value. The feature value vector obtained based on the extracted feature values of the pixel corresponds to the related vector in the obtained Sparse Bayesian Classification model containing related vectors of image features corresponding to the border.

The calculation module 1306 is configured to input the extracted feature value vector into a Sparse Bayesian Classification model containing vectors related to image features corresponding to the border, to obtain the probability that the image feature belongs to border features of various image regions.

The border determination module 1308 is configured to obtain borders of various image regions contained in a predefined image region based on the probability obtained for various pixels in the predefined image region.

A device for quick segmentation of an optical coherence tomography image provided by this disclosure has advantages of high-precision border location distinction and quick image segmentation.

An embodiment of this disclosure provides a computer readable storage medium having computer instructions stored thereon that, when executed by a processor, implement steps of a method for quick segmentation of an optical coherence tomography image as described above.

Described above is an illustrative implementation of a computer readable storage medium according to this embodiment. It is to be noted that, the technical solution of said storage medium share the conception of the method for terrain scene editing as described above. For details of the technical solution of said storage medium that have not been described, reference may be made to the description of the technical solution of a method for quick segmentation of an optical coherence tomography image as described above.

The computer instructions include computer program codes which may be in the form of a source code, an object code, an executable file, or some intermediate forms. The computer readable medium may include: any entity or device capable of carrying the computer program codes, a recording medium, a U disk, a removable hard disk, a magnetic disk, an optical disc, a computer memory, an (ROM Read-Only Memory), an RAM (Random Access Memory), electric carrier signals, telecommunication signals, and software distribution media. It should be noted that the content contained in the computer-readable medium can be increased or decreased as appropriate according to the requirements of legislation and patent practice in the jurisdictions. For example, in some jurisdictions, the computer readable medium excludes electric carrier signals and telecommunication signals.

The foregoing description of specific exemplary embodiments of the present invention has been provided for the purposes of illustration and exemplification. These descriptions are not intended to limit the invention to the precise forms disclosed, and it is apparent that many changes and modifications can be made in light of the above teachings. The selection and description of the exemplary embodiments are intended to explain the specific principles of the present invention and its practical application, so that those skilled in the art can implement and utilize the various exemplary embodiments of the present invention and various selections and changes. It is intended that the scope of the invention be defined by the Claims and their equivalents.

What is claimed is:

1. A method for quick segmentation of an optical coherence tomography image, comprising steps of:
    extracting a feature value related to a pixel in the optical coherence tomography image from the pixel to obtain a feature value representative of the pixel feature, the extracted feature value including at least one of an intensity gradient value of the pixel, an intensity multi-scale mean value of the pixel, or an angular feature value extracted from the pixel;
    inputting the extracted feature value into a Sparse Bayesian Classification model containing values related to image features corresponding to a border, to obtain a probability that the image feature belongs to features of various image region borders; and
    obtaining borders of various image regions contained in a predefined image region based on the probabilities obtained for various pixels in the predefined image region,
    wherein the step of extracting a feature value related to a pixel in the optical coherence tomography image from the pixel to obtain a feature value representative of the pixel feature comprises:
        extracting a plurality of feature values related to a pixel in the optical coherence tomography image from the pixel to obtain a feature value vector representative of the pixel feature,
    wherein the extracted feature values include the intensity gradient value and intensity multi-scale mean value of each pixel, and the step of inputting the extracted feature values into a Sparse Bayesian Classification model containing values related to image features corresponding to the border to obtain a probability that the image feature belongs to features of various image region borders comprises:
        inputting the extracted feature value vector into a Sparse Bayesian Classification model containing related vectors of the intensity gradient value and intensity multi-scale mean value of a border pixel, to obtain a probability that the image feature belongs to features of various image region borders.

2. The method for quick segmentation of an optical coherence tomography image of claim 1, wherein the step of obtaining borders of various image regions contained in a predefined image region based on the probability obtained for various pixels in the predefined image region comprises:
    obtaining a multi-dimensional probability vector for a pixel location in the predefined image region based on the probability for each of the pixels in the image region and its pixel location;
    extracting a probability representative of a border location from the multi-dimensional probability vector depending on shapes of the borders of various image regions to be extracted;

obtaining the pixel location corresponding to the probability representative of the border location based on said probability; and obtaining borders of various image regions based on the obtained pixel location.

3. The method for quick segmentation of an optical coherence tomography image of claim 1, wherein the feature value vector extracted from the pixel includes a feature value vector consisting of an intensity gradient value and intensity multi-scale mean value of the pixel and an angular feature value vector consisting of an angular feature value extracted from the pixel, and the obtaining borders of various image regions based on the probabilities obtained for image features at various locations in the image region comprises:

obtaining a first multi-dimensional probability vector corresponding to a pixel location in the predefined image region from the probability obtained based on the feature value vector including an intensity gradient value and intensity multi-scale mean value of each of the pixels in the image region and the pixel location in the image region that it represents;

obtaining a second multi-dimensional probability vector corresponding to a pixel location in the predefined image region from the probability obtained based on the angular feature value vector related to the pixel angle of each of the pixels in the image region of the pixel and the pixel location in the image region that it represents;

obtaining a probability representative of the image border from each column in the first multi-dimensional probability vector and each column in the second multi-dimensional probability vector respectively;

based on a probability representative of an image border extracted from each column in the first multi-dimensional probability vector and each column in the second multi-dimensional probability vector, obtaining a pixel location corresponding to the probability; and obtaining borders of various image regions based on the obtained pixel location.

4. The method for quick segmentation of an optical coherence tomography image of claim 1, wherein the method further comprises, before the extracting a feature value related to a pixel in the optical coherence tomography image from the pixel to obtain a feature value representative of the pixel feature:

configuring the Sparse Bayesian model on the basis that the probability of the feature value vector relative to related vectors representative of pixel features of various image region borders satisfies the Bernoulli distribution, and obtaining the Sparse Bayesian Classification model containing related vectors of image features corresponding to the border by inputting a feature value vector related to each of the pixels in the image region containing the border extracted from the pixel into a Sparse Bayesian Classification model and performing calculation thereon.

5. The method for quick segmentation of an optical coherence tomography image of claim 4, wherein the Sparse Bayesian Classification model containing related vectors of image features corresponding to the border includes:

$$p(t=1|w)=\sigma\{y(\tilde{x};w)\}=\sigma[\Sigma_{i=1}^{N_r} w_i K(x,x_i)+w_0]$$

where $x_i$ includes related vectors of pixel features of various image region borders, $w_i$ is a weight corresponding to a related vector $x_i$, $K(x,x_i)$ is a kernel function, $N_r$ is the number of the related vectors $x_i$, $w_0$ is a preset weight, $\sigma(y)=1/(1+e^{-y})$, $y=[\Sigma_{i=1}^{N_r} w_i K(x,x_i)+w_0]$, x is an input feature value vector, and $w_i$ and $x_i$ include values obtained by inputting a feature value vector related to the pixel feature extracted from each of the pixels in the image region containing the border into the Sparse Bayesian Classification model and performing calculation thereon.

6. The method for quick segmentation of an optical coherence tomography image of claim 5, wherein a Gaussian kernel function is used as $K(x,x_i)$.

7. The method for quick segmentation of an optical coherence tomography image of claim 6, wherein the obtaining the Sparse Bayesian model containing related vectors of image features corresponding to the border by configuring a classification model on the basis that the probability of the feature value vector relative to a related vector representative of pixel features of various image region borders satisfies the Bernoulli distribution comprises:

extracting feature value vectors of all the pixels in a second predefined region containing borders of various image regions;

obtaining the Sparse Bayesian Classification model by configuring a Classification model on the basis that the probability of the feature value vector relative to a related vector representative of pixel features of various image region borders satisfies the Bernoulli distribution:

$$P(t|w) = \prod_{n=1}^{N} \sigma\{y(x_n;w)\}^{t_n}[1-\sigma\{y(x_n;w)\}]^{1-t_n}$$

where $$\sigma(x) = 1/(1+e^{-x}),\ \sigma\{y(x_n;w)\}^{t_n} = 1\big/\left(1+e^{-\{y(x_n;w)\}^{t_n}}\right),$$

$$y(x_n;w) = \sum_{n=1}^{N} w_n K(x,x_n) + w_0,\ K(x,x_n)$$

is a kernel function, $x_n$ is the feature value vector of the $n^{th}$ pixel in the sample consisting of feature value vectors related to features of each of the pixels contained in the second predefined region extracted from the pixel, N is the number of feature value vectors in the sample, $w_n$ is the weight corresponding to $x_n$, and $t_n=1$;

setting the weight $w_n$ to satisfy a Gaussian probability distribution having a mean value of zero, and performing Laplace Theoretical Approximation on the Gaussian probability distribution of the weight $w_n$, to obtain an iterative formula related to $x_n$, inputting the feature value vector $x_n$ extracted from the pixel in the second predefined region into the iterative formula, to obtain a non-zero $w_n$ and a feature value vector corresponding to the non-zero $w_n$, the feature value vector corresponding to the non-zero $w_n$ being the related vector $x_i$ containing image features corresponding to the border, and the weight $w_n$ corresponding to the related vector $x_i$ being $w_i$; and substituting the related vector $x_i$ containing image features corresponding to the border for the feature value vector $x_n$ in the Sparse Bayesian Classification model, and substituting the weight $w_i$ corresponding to the related vector $x_i$ for $w_n$ corresponding to the feature value vector, to obtain a Sparse Bayesian Classification model containing related vectors of the image features corresponding to the border.

8. A computing device comprising a memory, a processor, and computer instructions stored in the memory and executable on the processor, wherein the instructions, when executed by the processor, implement steps of the method of claim 1.

* * * * *